US012637238B2

(12) United States Patent
Kim et al.

(10) Patent No.: US 12,637,238 B2
(45) Date of Patent: May 26, 2026

(54) AUTONOMOUS DRONE BATTERY MANAGEMENT

(71) Applicant: Brookhurst Garage, Inc., San Jose, CA (US)

(72) Inventors: Young Joon Kim, San Jose, CA (US); Wonjae Lee, Hwasung (KR); Kyuhwan Sim, Suwon (KR)

(73) Assignee: Brookhurst Garage, Inc., San Jose, CA (US)

( * ) Notice: Subject to any disclaimer, the term of this patent is extended or adjusted under 35 U.S.C. 154(b) by 0 days.

(21) Appl. No.: 18/224,960

(22) Filed: Jul. 21, 2023

(65) Prior Publication Data

US 2025/0026508 A1     Jan. 23, 2025

(51) Int. Cl.
| | |
|---|---|
| *B64U 50/39* | (2023.01) |
| *B60L 53/80* | (2019.01) |
| *B60L 58/10* | (2019.01) |
| *B64U 70/90* | (2023.01) |
| *H02J 7/00* | (2006.01) |
| *B64U 101/70* | (2023.01) |

(52) U.S. Cl.
CPC .............. *B64U 50/39* (2023.01); *B60L 53/80* (2019.02); *B60L 58/10* (2019.02); *B64U 70/90* (2023.01); *H02J 7/0013* (2013.01); *H02J 7/0042* (2013.01); *B60L 2200/10* (2013.01); *B64U 2101/70* (2023.01); *B64U 2201/10* (2023.01)

(58) Field of Classification Search
CPC .... B64U 50/39; B64U 70/90; B64U 2101/70; B64U 2201/10; B60L 53/80; B60L 58/10; B60L 2200/10; H02J 7/0013; H02J 7/0042
See application file for complete search history.

(56) References Cited

U.S. PATENT DOCUMENTS

2016/0039540 A1* 2/2016 Wang ......................... B64F 1/18
                                                        244/114 R

FOREIGN PATENT DOCUMENTS

| | | | |
|---|---|---|---|
| JP | 2009-179275 A | 8/2009 | |
| KR | 10-2019-0055925 A | 5/2019 | |
| KR | 102262305 B1 * | 6/2021 | .............. B64F 1/222 |
| KR | 102274911 B1 * | 7/2021 | .............. B60L 58/10 |
| WO | WO 2017/138803 A1 | 8/2017 | |

OTHER PUBLICATIONS

KR102262305B1 Translation (Year: 2021).*
KR102274911B1 Translation (Year: 2021).*
PCT International Search Report and Written Opinion, PCT Application No. PCT/US2023/028381, Apr. 16, 2024, 10 pages.

* cited by examiner

*Primary Examiner* — Christopher D Hutchens
*Assistant Examiner* — Steven J Shur
(74) *Attorney, Agent, or Firm* — Fenwick & West LLP

(57)     ABSTRACT

Embodiments relate to a drone and a base station. The drone is adapted to navigate a storage site and carry a swappable battery. The base station is adapted to receive the drone to perform a battery swap. As such, the base station may include charging ports to recharge the swappable battery and may be adapted to predict a return timing of the drone, charge a battery to a level in anticipation of the return timing, and subsequent to the drone returning to the base station, swapping the battery of the drone with the charged battery.

20 Claims, 10 Drawing Sheets

AUTONOMOUS DRONE BATTERY MANAGEMENT

TECHNICAL FIELD

The disclosure generally relates to robots used in a storage site and, more specifically, to the management of batteries used in drones.

BACKGROUND

Storage sites may employ autonomous drones to navigate and perform tasks around storage sites. To enable such activity, drones may be equipped with batteries. However, due to the complex nature of drone use in storage sites, with drones performing activities of varying lengths and with varying demands on battery usage, it may be difficult to optimally manage battery use. In the short term, poor battery management may result in batteries draining before the end of a trip or completion of a task, requiring extra resources to retrieve or repower the drone in place, or posing an obstacle for other drones trying to navigate the storage site. Poor battery management may introduce unwanted delays between activities while drones sit idle, waiting for a battery to charge. In the long term, poor battery management may reduce battery health, for example by charging and discharging in patterns that reduce a battery's life or capacity.

SUMMARY

Embodiments relate to a drone and a base station. The drone is adapted to navigate a storage site and carry a swappable battery. The base station is adapted to receive the drone to perform a battery swap. As such, the base station may include charging ports to recharge the swappable battery and may be adapted to predict a return timing of the drone, charge a battery to a level in anticipation of the return timing, and subsequent to the drone returning to the base station, swapping the battery of the drone with the charged battery.

The figures depict, and the detailed description describes, various non-limiting embodiments for purposes of illustration only.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments relate to a robot that navigates through a storage site by visually recognizing objects in the environment, including racks and rows and columns of the racks, and counting the number of objects that the robot has passed. The robot may use an image sensor to continuously capture the environment of the storage site. The images are analyzed by image segmentation techniques to identify the outline of the readily identifiable objects such as racks and their rows and columns. By counting the number of racks that the robot has passed, the robot can identify an aisle at which a target location is located. The robot can also count the number of rows and columns to identify the target location of the rack.

System Overview

Figure 1:
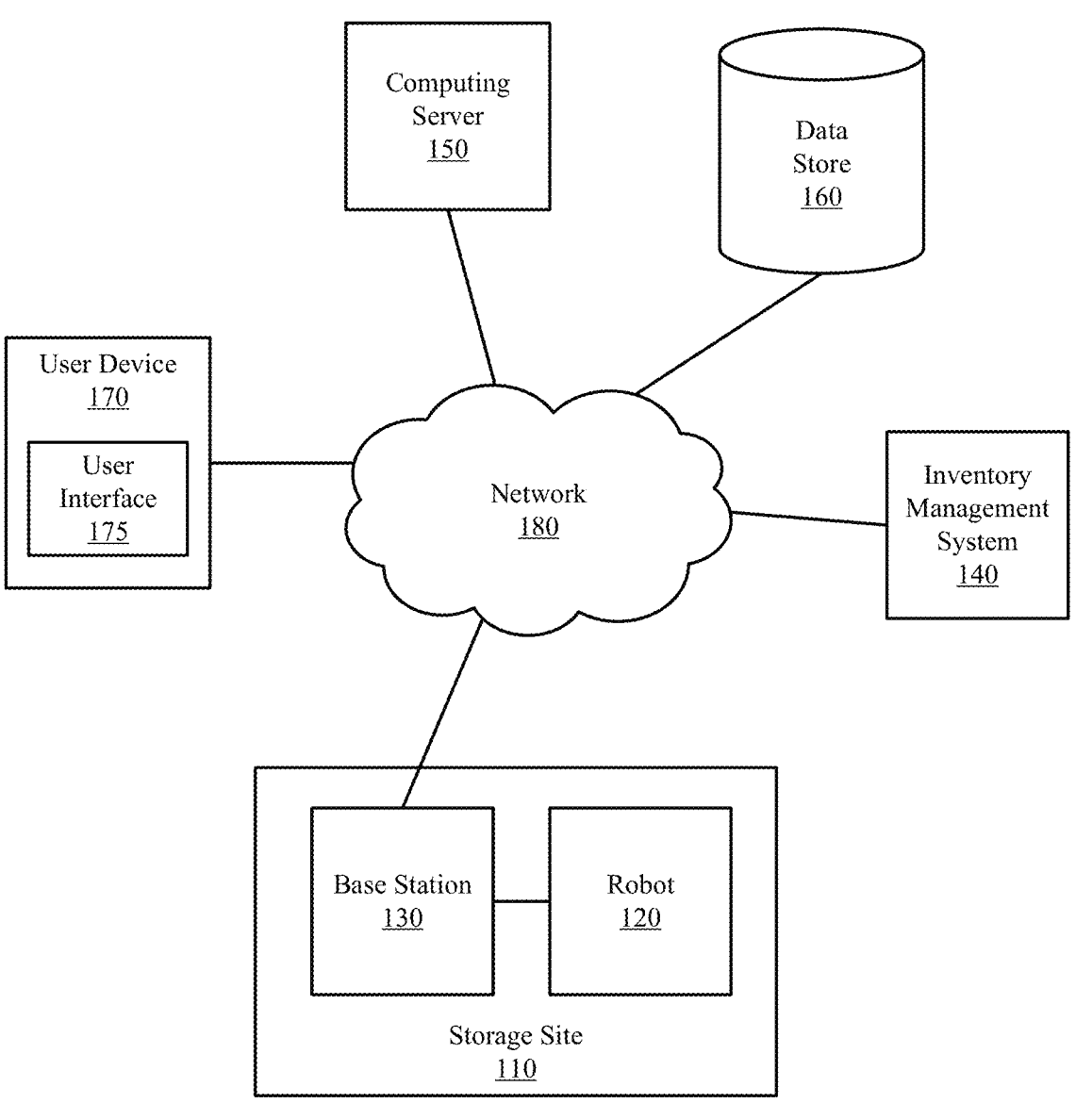
FIG. 1 is a block diagram that illustrates a system environment of an example storage site, according to an embodiment.

FIG. 1 is a block diagram that illustrates a system environment 100 of an example robotically-assisted or fully autonomous storage site, according to an embodiment. By way of example, the system environment 100 includes a storage site 110, a robot 120, a base station 130, an inventory management system 140, a computing server 150, a data store 160, and a user device 170. The entities and components in the system environment 100 communicate with each other through the network 180. In various embodiments, the system environment 100 may include different, fewer, or additional components. Also, while each of the components in the system environment 100 is described in a singular form, the system environment 100 may include one or more of each of the components. For example, the storage site 110 may include one or more robots 120 and one or more base stations 130. Each robot 120 may have a corresponding base station 130 or multiple robots 120 may share a base station 130.

A storage site 110 may be any suitable facility that stores, sells, or displays inventories such as goods, merchandise, groceries, articles and collections. Example storage sites 110 may include warehouses, inventory sites, bookstores, shoe stores, outlets, other retail stores, libraries, museums, etc. A storage site 110 may include a number of regularly shaped structures. Regularly shaped structures may be structures, fixtures, equipment, furniture, frames, shells, racks, or other suitable things in the storage site 110 that have a regular shape or outline that can be readily identifiable, whether the things are permanent or temporary, fixed or movable, weight-bearing or not. The regularly shaped structures are often used in a storage site 110 for storage of inventory. For example, racks (including metallic racks, shells, frames, or other similar structures) are often used in a warehouse for the storage of goods and merchandise. However, not all regularly shaped structures may need to be used for inventory storage. A storage site 110 may include a certain layout that allows various items to be placed and stored systematically. For example, in a warehouse, the racks may be grouped by sections and separated by aisles. Each rack may include multiple pallet locations that can be identified using a row number and a column number. A storage site may include high racks and low racks, which may, in some case, largely carry most of the inventory items near the ground level.

A storage site 110 may include one or more robots 120 that are used to keep track of the inventory and to manage the inventory in the storage site 110. For the ease of reference, the robot 120 may be referred to in a singular form, even though more than one robot 120 may be used. Also, in some embodiments, there can be more than one type of robot 120 in a storage site 110. For example, some robots 120 may specialize in scanning inventory in the storage site 110, while other robots 120 may specialize in moving items. A robot 120 may also be referred to as an autonomous robot, an inventory cycle-counting robot, an inventory survey robot, an inventory detection robot, or an inventory management robot. An inventory robot may be used to track inventory items, move inventory items, and carry out other inventory management tasks. The degree of autonomy may vary from embodiments to embodiments. For example, in one embodiment, the robot 120 may be fully autonomous so that the robot 120 automatically performs assigned tasks. In some embodiments, an autonomous robot 120 may refer to a robot that can navigate through the storage site 110 with a navigation algorithm but may still allow some levels of human intervention, commands, or controls. In some embodiments, no matter what the degree of autonomy it has, a robot 120 may also be controlled remotely and may be switched to a manual mode. The robot 120 may take various forms such as an aerial drone, a ground robot, a vehicle, a forklift, and a mobile picking robot.

A base station 130 may be a device for the robot 120 to return and, for a drone, to land. The base station 130 may include more than one return site. The base station 130 may be used to repower the robot 120. Various ways to repower the robot 120 may be used in different embodiments. For example, in one embodiment, the base station 130 serves as a battery-swapping station that exchanges batteries on a robot 120 as the robot arrives at the base station to allow the robot 120 to quickly resume duty. The replaced batteries may be charged at the base station 130, wired or wirelessly. In another embodiment, the base station 130 serves as a charging station that has one or more charging terminals to be coupled to the charging terminal of the robot 120 to recharge the batteries of the robot 120. In yet another embodiment, the robot 120 may use fuel for power and the base station 130 may repower the robot 120 by filling its fuel tank.

The base station 130 may also serve as a communication station for the robot 120. For example, for certain types of storage sites 110 such as warehouses, network coverage may not be present or may only be present at certain locations. The base station 130 may communicate with other components in the system environment 100 using wireless or wired communication channels such as Wi-Fi or an Ethernet cable. The robot 120 may communicate with the base station 130 when the robot 120 returns to the base station 130. The base station 130 may send inputs such as commands to the robot

120 and download data captured by the robot 120. In embodiments where multiple robots 120 are used, the base station 130 may be equipped with a swarm control unit or algorithm to coordinate the movements among the robots. The base station 130 and the robot 120 may communicate in any suitable ways such as radio frequency, Bluetooth, near-field communication (NFC), or wired communication. While, in one embodiment, the robot 120 mainly communicates to the base station, in other embodiments the robot 120 may also have the capability to directly communicate with other components in the system environment 100. In one embodiment, the base station 130 may serve as a wireless signal amplifier for the robot 120 to directly communicate with the network 180.

The inventory management system 140 may be a computing system that is operated by the administrator (e.g., a company that owns the inventory, a warehouse management administrator, a retailer selling the inventory) using the storage site 110. The inventory management system 140 may be a system used to manage the inventory items. The inventory management system 140 may include a database that stores data regarding inventory items and the items' associated information, such as quantities in the storage site 110, metadata tags, asset type tags, barcode labels and location coordinates of the items. The inventory management system 140 may provide both front-end and back-end software for the administrator to access a central database and point of reference for the inventory and to analyze data, generate reports, predict future demands, and manage the locations of the inventory items to ensure items are correctly placed. An administrator may rely on the item coordinate data in the inventory management system 140 to ensure that items are correctly placed in the storage site 110 so that the items can be readily retrieved from a storage location. This prevents an incorrectly placed item from occupying a space that is reserved for an incoming item and also reduces time to locate a missing item at an outbound process.

The computing server 150 may be a server that is tasked with analyzing data provided by the robot 120 and provide commands for the robot 120 to perform various inventory recognition and management tasks. The robot 120 may be controlled by the computing server 150, the user device 170, or the inventory management system 140. For example, the computing server 150 may direct the robot 120 to scan and capture pictures of inventory stored at various locations at the storage site 110. Based on the data provided by the inventory management system 140 and the ground truth data captured by the robot 120, the computing server 150 may identify discrepancies in two sets of data and determine whether any items may be misplaced, lost, damaged, or otherwise should be flagged for various reasons. In turn, the computing server 150 may direct a robot 120 to remedy any potential issues such as moving a misplaced item to the correct position. In one embodiment, the computing server 150 may also generate a report of flagged items to allow site personnel to manually correct the issues.

The computing server 150 may include one or more computing devices that operate at different locations. For example, a part of the computing server 150 may be a local server that is located at the storage site 110. The computing hardware such as the processor may be associated with a computer on site or may be included in the base station 130. Another part of the computing server 150 may be a cloud server that is geographically distributed. The computing server 150 may serve as a ground control station (GCS), provide data processing, and maintain end-user software that may be used in a user device 170. A GCS may be responsible for the control, monitor and maintenance of the robot 120. In one embodiment, GCS is located on-site as part of the base station 130. The data processing pipeline and end-user software server may be located remotely or on-site.

The computing server 150 may maintain software applications for users to manage the inventory, the base station 130, and the robot 120. The computing server 150 and the inventory management system 140 may or may not be operated by the same entity. In one embodiment, the computing server 150 may be operated by an entity separated from the administrator of the storage site. For example, the computing server 150 may be operated by a robotic service provider that supplies the robot 120 and related systems to modernize and automate a storage site 110. The software application provided by the computing server 150 may take several forms. In one embodiment, the software application may be integrated with or as an add-on to the inventory management system 140. In another embodiment, the software application may be a separate application that supplements or replaces the inventory management system 140. In one embodiment, the software application may be provided as software as a service (SaaS) to the administrator of the storage site 110 by the robotic service provider that supplies the robot 120.

The data store 160 includes one or more storage units such as memory that takes the form of non-transitory and non-volatile computer storage medium to store various data that may be uploaded by the robot 120 and inventory management system 140. For example, the data stored in data store 160 may include pictures, sensor data, and other data captured by the robot 120. The data may also include inventory data that is maintained by the inventory management system 140. The computer-readable storage medium is a medium that does not include a transitory medium such as a propagating signal or a carrier wave. The data store 160 may take various forms. In one embodiment, the data store 160 communicates with other components by the network 180. This type of data store 160 may be referred to as a cloud storage server. Example cloud storage service providers may include AWS, AZURE STORAGE, GOOGLE CLOUD STORAGE, etc. In another embodiment, instead of a cloud storage server, the data store 160 is a storage device that is controlled and connected to the computing server 150. For example, the data store 160 may take the form of memory (e.g., hard drives, flash memories, discs, ROMs, etc.) used by the computing server 150 such as storage devices in a storage server room that is operated by the computing server 150.

The user device 170 may be used by an administrator of the storage site 110 to provide commands to the robot 120 and to manage the inventory in the storage site 110. For example, using the user device 170, the administrator can provide task commands to the robot 120 for the robot to automatically complete the tasks. In one case, the administrator can specify a specific target location or a range of storage locations for the robot 120 to scan. The administrator may also specify a specific item for the robot 120 to locate or to confirm placement. In some embodiments, the user device 170 may be used by an administrator to request trips for the robot 120, which may include series of tasks for the robot to perform. The administrator may specify an order for the robot 120 to perform the tasks, locations of the tasks, and a time for the trip to start. The user device 170 may send requested trips to the robot 120 or to the base station 130. Examples of user devices 170 include personal computers (PCs), desktop computers, laptop computers, tablet computers, smartphones, wearable electronic devices such as smartwatches, or any other suitable electronic devices.

The user device 170 may include a user interface 175, which may take the form of a graphical user interface (GUI). Software application provided by the computing server 150 or the inventory management system 140 may be displayed as the user interface 175. The user interface 175 may take different forms. In one embodiment, the user interface 175 is part of a front-end software application that includes a GUI displayed at the user device 170. In one case, the front-end software application is a software application that can be downloaded and installed at user devices 170 via, for example, an application store (e.g., App Store) of the user device 170. In another case, the user interface 175 takes the form of a Web interface of the computing server 150 or the inventory management system 140 that allows clients to perform actions through web browsers. In another embodiment, user interface 175 does not include graphical elements but communicates with the computing server 150 or the inventory management system 140 via other suitable ways such as command windows or application program interfaces (APIs).

The communications among the robot 120, the base station 130, the inventory management system 140, the computing server 150, the data store 160, and the user device 170 may be transmitted via a network 180, for example, via the Internet. In one embodiment, the network 180 uses standard communication technologies and/or protocols. Thus, the network 180 can include links using technologies such as Ethernet, 802.11, worldwide interoperability for microwave access (WiMAX), 3G, 4G, LTE, 5G, digital subscriber line (DSL), asynchronous transfer mode (ATM), InfiniBand, PCI Express, etc. Similarly, the networking protocols used on the network 180 can include multiprotocol label switching (MPLS), the transmission control protocol/Internet protocol (TCP/IP), the user datagram protocol (UDP), the hypertext transport protocol (HTTP), the simple mail transfer protocol (SMTP), the file transfer protocol (FTP), etc. The data exchanged over the network 180 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet protocol security (IPsec), etc. The network 180 also includes links and packet switching networks such as the Internet. In some embodiments, two computing servers, such as computing server 150 and inventory management system 140, may communicate through APIs. For example, the computing server 150 may retrieve inventory data from the inventory management system 140 via an API.

Example Robot and Base Station

Figure 2:
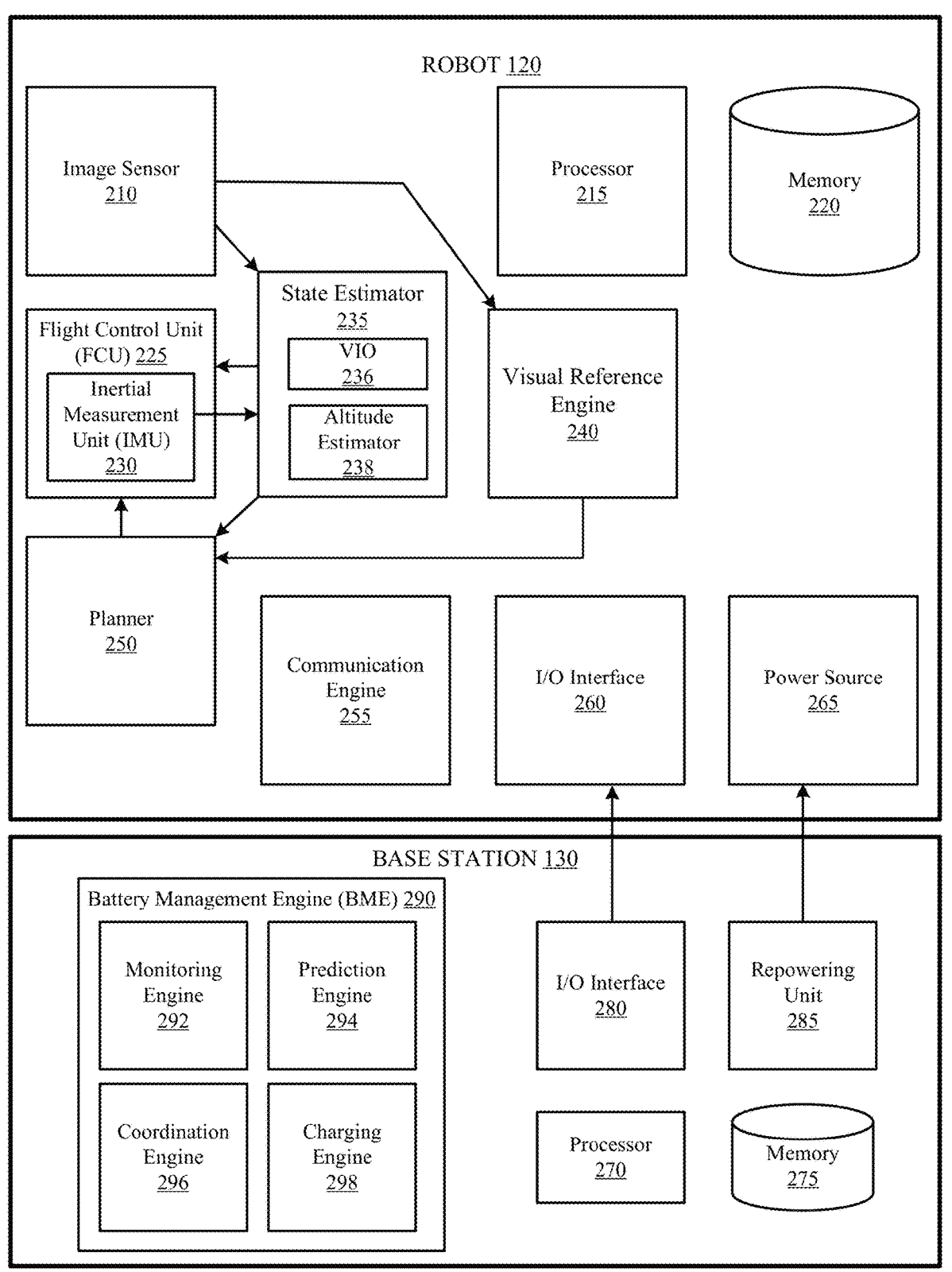
FIG. 2 is a block diagram that illustrates components of an example robot and an example base station, according to an embodiment.

FIG. 2 is a block diagram illustrating components of an example robot 120 and an example base station 130, according to an embodiment. The robot 120 may include an image sensor 210, a processor 215, memory 220, a flight control unit (FCU) 225 that includes an inertia measurement unit (IU) 230, a state estimator 235, a visual reference engine 240, a planner 250, a communication engine 255, an I/O interface 260, and a power source 265. The functions of the robot 120 may be distributed among various components in a different manner than described below. In various embodiments, the robot 120 may include different, fewer, and/or additional components. Also, while each of the components in FIG. 2 is described in a singular form, the components may present in plurality. For example, a robot 120 may include more than one image sensor 210 and more than one processor 215.

The image sensor 210 captures images of an environment of a storage site for navigation, localization, collision avoidance, object recognition and identification, and inventory recognition purposes. A robot 120 may include more than one image sensors 210 and more than one type of such image sensors 210. For example, the robot 120 may include a digital camera that captures optical images of the environment for the state estimator 235. For example, data captured by the image sensor 210 may also be provided to the VIO unit 236 that may be included in the state estimator 235 for localization purposes such as to determine the position and orientation of the robot 120 with respect to an inertial frame, such as a global frame whose location is known and fixed. The robot 120 may also include a stereo camera that includes two or more lenses to allow the image sensor 210 to capture three-dimensional images through stereoscopic photography. For each image frame, the stereo camera may generate pixel values such as in red, green, and blue (RGB) and point cloud data that includes depth information. The images captured by the stereo camera may be provided to visual reference engine 240 for object recognition purposes. The image sensor 210 may also be another type of image sensor such as a light detection and ranging (LIDAR) sensor, an infrared camera, and 360-degree depth cameras. The image sensor 210 may also capture pictures of labels (e.g., barcodes) on items for inventory cycle-counting purposes. In some embodiments, a single stereo camera may be used for various purposes. For example, the stereo camera may provide image data to the visual reference engine 240 for object recognition. The stereo camera may also be used to capture pictures of labels (e.g., barcodes). In some embodiments, the robot 120 includes a rotational mount such as a gimbal that allows the image sensor 210 to rotate in different angles and to stabilize images captured by the image sensor 210. In one embodiment, the image sensor 210 may also capture data along the path for the purpose of mapping the storage site.

The robot 120 includes one or more processors 215 and one or more memories 220 that store one or more sets of instructions. The one or more sets of instructions, when executed by one or more processors, cause the one or more processors to carry out processes that are implemented as one or more software engines. Various components, such as FCU 225 and state estimator 235, of the robot 120 may be implemented as a combination of software and hardware (e.g., sensors). The robot 120 may use a single general processor to execute various software engines or may use separate more specialized processors for different functionalities. In one embodiment, the robot 120 may use a general-purpose computer (e.g., a CPU) that can execute various instruction sets for various components (e.g., FCU 225, visual reference engine 240, state estimator 235, planner 250). The general-purpose computer may run on a suitable operating system such as LINUX, ANDROID, etc. For example, in one embodiment, the robot 120 may carry a smartphone that includes an application used to control the robot. In another embodiment, the robot 120 includes multiple processors that are specialized in different functionalities. For example, some of the functional components such as FCU 225, visual reference engine 240, state estimator 235, and planner 250 may be modularized and each includes its own processor, memory, and a set of instructions. The robot 120 may include a central processor unit (CPU) to coordinate and communicate with each modularized component. Hence, depending on embodiments, a robot 120 may include a single processor or multiple processors 215 to carry out various operations. The memory 220 may also store images and videos captured by the image sensor 210. The images may include images that capture the surrounding environment and images of the inventory such as barcodes and labels.

The flight control unit (FCU) 225 may be a combination of software and hardware, such as inertial measurement unit (IMU) 230 and other sensors, to control the movement of the robot 120. For ground robot 120, the flight control unit 225 may also be referred to as a microcontroller unit (MCU). The FCU 225 relies on information provided by other components to control the movement of the robot 120. For example, the planner 250 determines the path of the robot 120 from a starting point to a destination and provides commands to the FCU 225. Based on the commands, the FCU 225 generates electrical signals to various mechanical parts (e.g., actuators, motors, engines, wheels) of the robot 120 to adjust the movement of the robot 120. The precise mechanical parts of the robots 120 may depend on the embodiments and the types of robots 120.

The IMU 230 may be part of the FCU 225 or may be an independent component. The IMU 230 may include one or more accelerometers, gyroscopes, and other suitable sensors to generate measurements of forces, linear accelerations, and rotations of the robot 120. For example, the accelerometers measure the force exerted on the robot 120 and detect the linear acceleration. Multiple accelerometers cooperate to detect the acceleration of the robot 120 in the three-dimensional space. For instance, a first accelerometer detects the acceleration in the x-direction, a second accelerometer detects the acceleration in the y-direction, and a third accelerometer detects the acceleration in the z-direction. The gyroscopes detect the rotations and angular acceleration of the robot 120. Based on the measurements, a processor 215 may obtain the estimated localization of the robot 120 by integrating the translation and rotation data of the IMU 230 with respect to time.

The state estimator 235 may correspond to a set of software instructions stored in the memory 220 that can be executed by the processor 215. The state estimator 235 may be used to generate localization information of the robot 120 and may include various sub-components for estimating the state of the robot 120. For example, in one embodiment, the state estimator 235 may include a visual-inertial odometry (VIO) unit 236 and an attitude estimator 238. In other embodiments, other modules, sensors, and algorithms may also be used in the state estimator 235 to determine the location of the robot 120.

The VIO unit 236 receives image data from the image sensor 210 (e.g., a stereo camera) and measurements from IMU 230 to generate localization information such as the position and orientation of the robot 120. The localization data obtained from the double integration of the acceleration measurements from the IMU 230 is often prone to drift errors. The VIO unit 236 may extract image feature points and tracks the feature points in the image sequence to generate optical flow vectors that represent the movement of edges, boundaries, surfaces of objects in the environment captured by the image sensor 210. Various signal processing techniques such as filtering (e.g., Wiener filter, Kalman filter, bandpass filter, particle filter) and optimization, and data/image transformation may be used to reduce various errors in determining localization information.

The altitude estimator 238 may be a combination of software and hardware that are used to determine the absolute altitude and relative altitude (e.g., distance from an object that lies on the floor) of the robot 120. The altitude estimator 238 may include a downward range finder that may measure the altitude relative to the ground to an object underneath the robot 120. A range finder may include IR (or any suitable signals) emitters and sensors that detect the round-trip time of the IR reflected by an object. The altitude estimator 238 may also receive data from the VIO unit 236 that may estimate the absolute altitude of the robot 120, but usually in a less accurate fashion compared to a range finder. The altitude estimator 238 may include software algorithms to combine data generated by the range finder and the data generated by the VIO unit 236 as the robot 120 flies over various objects and inventory that are placed on the floor or other horizontal levels. The data generated by the altitude estimator 238 may be used for collision avoidance and finding a target location. The altitude estimator 238 may set a global maximum altitude to prevent the robot 120 from hitting the ceiling. The altitude estimator 238 also provides information regarding how many rows in the rack are below the robot 120 for the robot 120 to locate a target location. The altitude data may be used in conjunction with the count of rows that the robot 120 has passed to determine the vertical level of the robot 120.

The visual reference engine 240 may correspond to a set of software instructions stored in the memory 220 that can be executed by the processor 215. The visual reference engine 240 may include various image processing algorithm and location algorithm to determine the current location of the robot 120, to identify the objects, edges, and surfaces of the environment near the robot 120, and to determine an estimated distance and orientation (e.g., yaw) of the robot 120 relative to a nearby surface of an object. The visual reference engine 240 may receive pixel data of a series of images and point cloud data from the image sensor 210. The location information generated by the visual reference engine 240 may include distance and yaw from an object and center offset from a target point (e.g., a midpoint of a target object).

The visual reference engine 240 may include one or more algorithms and machine learning models to create image segmentations from the images captured by the image sensor 210. The image segmentation may include one or more segments that separate the frames (e.g., vertical or horizontal bars of racks) or outlines of regularly shaped structures appearing in the captured images from other objects and environments. The algorithms used for image segmentation may include a convolutional neural network (CNN). In performing the segmentation, other image segmentation algorithms such as edge detection algorithms (e.g., Canny operator, Laplacian operator, Sobel operator, Prewitt operator), corner detection algorithms, Hough transform, and other suitable feature detection algorithms may also be used.

The visual reference engine 240 also performs object recognition (e.g., object detection and further analyses) and keeps track of the relative movements of the objects across a series of images. The visual reference engine 240 may track the number of regularly shaped structures in the storage site 110 that are passed by the robot 120. For example, the visual reference engine 240 may identify a reference point (e.g., centroid) of a frame of a rack and determine if the reference point passes a certain location of the images across a series of images (e.g., whether the reference point passes the center of the images). If so, the visual reference engine 240 increments the number of regularly shaped structures that have been passed by the robot 120.

The robot 120 may use various components to generate various types of location information (including location information relative to nearby objects and localization information). For example, in one embodiment, the state estimator 235 may process the data from the VIO unit 236 and the altitude estimator 238 to provide localization information to the planner 250. The visual reference engine 240 may count the number of regularly shaped structures that the robot 120 has passed to determine a current location. The visual reference engine 240 may generate location information relative to nearby objects. For example, when the robot 120 reaches a target location of a rack, the visual reference engine 240 may use point cloud data to reconstruct a surface of the rack and use the depth data from the point cloud to determine more accurate yaw and distance between the robot 120 and the rack. The visual reference engine 240 may determine a center offset, which may correspond to the distance between the robot 120 and the center of a target location (e.g., the midpoint of a target location of a rack). Using the center offset information, the planner 250 controls the robot 120 to move to the target location and take a picture of the inventory in the target location. When the robot 120 changes direction (e.g., rotations, transitions from horizontal movement to vertical movement, transitions from vertical movement to horizontal movement, etc.), the center offset information may be used to determine the accurate location of the robot 120 relative to an object.

The planner 250 may correspond to a set of software instructions stored in the memory 220 that can be executed by the processor 215. The planner 250 may include various routing algorithms to plan a path of the robot 120 as the robot travels from a first location (e.g., a starting location, the current location of the robot 120 after finishing the previous journey) to a second location (e.g., a target destination). The robot 120 may receive inputs such as user commands (e.g., from user device 170) to perform certain actions (e.g., scanning of inventory, moving an item, etc.) at certain locations. The robot 120 may receive inputs such as trips requested by administrators through the user device 170. The planner 250 may include two types of routes, which correspond to a spot check and a range scan. In a spot check, the planner 250 may receive an input (e.g., a requested trip) that includes coordinates of one or more specific target locations. In response, the planner 250 plans a path for the robot 120 to travel to the target locations to perform an action. In a range scan, the input may include a range of coordinates corresponding to a range of target locations. In response, the planner 250 plans a path for the robot 120 to perform a full scan or actions for the range of target locations. In some embodiments, the planner 250 may transmit the planned path to the base station 130. Along with the planned path, the planner 250 may additionally transmit path metadata, for example path length, locations along the path (e.g., starting location, end location, and target locations), actions corresponding to each location, speeds of the robot along each segment of the path, estimated time for the robot to spend along the path, estimated time for the robot to spend at each location, and estimated duration of the trip. In some embodiments, the planner 250 may provide commands to the FCU 225 that cause the robot 120 to follow the path.

The planner 250 may plan the route of the robot 120 based on data provided by the visual reference engine 240 and the data provided by the state estimator 235. For example, the visual reference engine 240 estimates the current location of the robot 120 by tracking the number of regularly shaped structures in the storage site 110 passed by the robot 120.

Based on the location information provided by the visual reference engine 240, the planner 250 determines the route of the robot 120 and may adjust the movement of the robot 120 as the robot 120 travels along the route.

The planner 250 may also include a fail-safe mechanism in the case where the movement of the robot 120 has deviated from the plan. For example, if the planner 250 determines that the robot 120 has passed a target aisle and traveled too far away from the target aisle, the planner 250 may send signals to the FCU 225 to try to remedy the path. If the error is not remedied after a timeout or within a reasonable distance, or the planner 250 is unable to correctly determine the current location, the planner 250 may direct the FCU to land or to stop the robot 120.

Relying on various location information, the planner 250 may also include algorithms for collision avoidance purposes. In one embodiment, the planner 250 relies on the distance information, the yaw angle, and center offset information relative to nearby objects to plan the movement of the robot 120 to provide sufficient clearance between the robot 120 and nearby objects. Alternatively, or additionally, the robot 120 may include one or more depth cameras such as a 360-degree depth camera set that generates distance data between the robot 120 and nearby objects. The planner 250 uses the location information from the depth cameras to perform collision avoidance.

The communication engine 255 and the I/O interface 260 are communication components to allow the robot 120 to communicate with other components in the system environment 100. A robot 120 may use different communication protocols, wireless or wired, to communicate with an external component such as the base station 130 or the user device 170. Example communication protocols may include Wi-Fi, Bluetooth, NFC, USB, etc. that couple the robot 120 to the base station 130 or the user device 170. The robot 120 may transmit various types of data, such as image data, flight logs, location data, inventory data, sensor data, and robot status. The robot 120 may also receive inputs from an external source to specify the actions that need to be performed by the robot 120. The commands may be automatically generated or manually generated by an administrator. The communication engine 255 may include algorithms for various communication protocols and standards, encoding, decoding, multiplexing, traffic control, data encryption, etc. for various communication processes. The I/O interface 260 may include software and hardware component such as hardware interface, antenna, and so forth for communication.

The robot 120 also includes a power source 265 used to power various components and the movement of the robot 120. The power source 265 may be one or more batteries or a fuel tank. Example batteries may include lithium-ion batteries, lithium polymer (LiPo) batteries, fuel cells, and other suitable battery types. The batteries may be placed inside permanently or may be easily replaced. For example, batteries may be detachable so that the batteries may be swapped when the robot 120 returns to the base station 130.

While FIG. 2 illustrates various example components, a robot 120 may include additional components. For example, some mechanical features and components of the robot 120 are not shown in FIG. 2. Depending on its type, the robot 120 may include various types of motors, actuators, robotic arms, lifts, other movable components, other sensors for performing various tasks.

Continuing to refer to FIG. 2, an example base station 130 includes a processor 270, a memory 275, an I/O interface 280, a repowering unit 285, and a battery management engine (BME) 290. In various embodiments, the base station 130 may include different, fewer, and/or additional components.

The base station 130 includes one or more processors 270 and one or more memories 275 that include one or more set of instructions for causing the processors 270 to carry out various processes that are implemented as one or more software modules. The base station 130 may provide inputs and commands to the robot 120 for performing various inventory management tasks. The base station 130 may also include an instruction set for performing swarm control among multiple robots 120. Swarm control may include task allocation, routing and planning, coordination of movements among the robots to avoid collisions, etc. The base station 130 may serve as a central control unit to coordinate the robots 120. In some embodiments, the base station 130 may manage additional components used by the robot 120. For example, the base station 130 may manage batteries used to power the robot, monitoring battery status, predicting battery use, coordinating the use of batteries in a system of robots, and charging batteries. The memory 275 may also include various sets of instructions for performing analysis of data and images downloaded from a robot 120. The base station 130 may provide various degrees of data processing from raw data format conversion to a full data processing that generates useful information for inventory management. Alternatively, or additionally, the base station 130 may directly upload the data downloaded from the robot 120 to a data store, such as the data store 160. The base station 130 may also provide operation, administration, and management commands to the robot 120. In one embodiment, the base station 130 can be controlled remotely by the user device 170, the computing server 150, or the inventory management system 140.

The base station 130 may also include various types of I/O interfaces 280 for communications with the robot 120 and to the Internet. The base station 130 may communicate with the robot 120 continuously using a wireless protocol such as Wi-Fi or Bluetooth. In one embodiment, one or more components of the robot 120 in FIG. 2 may be located in the base station and the base station may provide commands to the robot 120 for movement and navigation. Alternatively, or additionally, the base station 130 may also communicate with the robot 120 via short-range communication protocols such as NFC or wired connections when the robot 120 lands or stops at the base station 130. The base station 130 may be connected to the network 180 such as the Internet. The wireless network (e.g., LAN) in some storage sites 110 may not have sufficient coverage. The base station 130 may be connected to the network 180 via an Ethernet cable. In various embodiments, the base station 130 may include different, fewer, and/or additional components.

The battery management engine (BME) 290 manages the batteries used to power one or more drones, where a drone is an example of the robot 120. The described battery management technique may be applied to other types of robots, such as ground robots. The BME 290 may monitor battery status, predict battery use, coordinate the use of batteries in a system of drones, and charge batteries. The BME 290 includes a monitoring engine 292, a prediction engine 294, a coordination engine 296, and a charging engine 298. In various embodiments, the BME 290 may include different, fewer, and/or additional components. In some embodiments, the BME 290 may also use any machine learning model to predict battery usage as described in FIG. 8.

The monitoring engine 292 monitors a battery state of a battery. The battery state may include variables such as current, voltage, temperature, state of charge (SoC), state of health (SoH), energy delivered since last charge, total number of cycles, time since first use, or idle time. The current is the current flow in or out of the battery. The voltage may be either the voltage of a battery cell or the voltage of a battery pack, a group of battery cells (e.g., a group of four cells). The temperature is of the battery cell surface and/or of the battery circuit (e.g., field-effect transistor (FET) or relay). The SoC of the battery is the charge level of the battery (e.g., 80% charged). The SoH of the battery is a measurement of the capacity, which may be measured as a percentage of the battery's original capacity. For example, if the original battery had a battery capacity of 1200 mAh (e.g., a AAA battery), and the battery after some use has a capacity of 1080 mAh, the SoH for the battery would be 90%. The total number of cycles is the number of charge and discharge cycles the battery has gone through. The time since first use may be the total time since first use of the battery or the time spent charging/discharging since first use (e.g., time spent not idle). The idle time of the battery is the time the battery spends without charging or discharging. The battery state may also include whether the battery is unavailable (e.g., in a deployed drone) or available (e.g., at the base station 130, in a drone that is not deployed).

In some embodiments, a battery may be at the base station 130, and the monitoring engine 292 may measure a battery state of the battery using sensors located at the base station 130. For example, the monitoring engine 292 may use a voltmeter to measure the battery voltage and may use a discharge curve (voltage vs. SoC) of the battery to determine the SoC of the battery. In some embodiments, a battery may not be at the base station 130, for example if the battery is in a deployed drone. In these embodiments, the monitoring engine 292 may receive battery status from sensors on the drone. For example, the monitoring engine 292 may receive the temperature of the battery from a temperature sensor on the drone. The monitoring engine 292 may log the battery state in the memory 275 along with a corresponding time-stamp.

The monitoring engine 292 may compare the battery state to a set of battery requirements. The battery requirements may be limits or ranges that specify ideal operating conditions or safety requirements for battery. For example, battery requirements may be that SoH be above 80%, the SoC be above 20%, the battery cell surface temperature be less than 70° C., and the cell voltage difference be less than 0.2V. The monitoring engine 292 may compare the battery state to different sets of battery requirements for different use cases. For example, for deciding whether to use the battery in the drone or charge the battery, one battery requirement may be that the battery have a cell voltage between 2V and 4.25V and a pack voltage of between 8V and 17V. However, for a battery in a drone that is making a trip, such as a trip requested by an administrator, the battery requirement may be that the battery have a pack voltage of at least 12V.

Responsive to the battery state not meeting the battery requirements, the monitoring engine 292 may take a remediation action. Example remediation actions may include instructing the drone to stop, make an emergency landing, power down, or return to the base station 130. Remediation actions may include instructing an administrator to manually check on the status of the drone. The monitoring engine 292 may take different remediation actions depending on how far the battery state is from meeting the battery requirements. For example, for the battery requirement that the cell voltage difference be less than 0.2V, responsive to detecting a cell voltage difference greater than 0.2V, the BME 290 may instruct the drone to return to the base station 130. However, for the same battery requirement, responsive to detecting a cell voltage difference greater than 0.4V, the monitoring engine 292 may instruct the drone to make an emergency landing. The monitoring engine 292 may take multiple remediation actions.

The prediction engine 294 may predict battery usage for a requested trip for the drone. The prediction engine 294 may request and/or receive a path and path metadata from the planner 250, the path corresponding to the requested trip. As described with respect to the planner 250, path metadata may include a length of the path, a set of locations along the path (e.g., starting location, end location, and target locations), actions corresponding to each location, speed of the drone along each segment of the path, estimated time for the drone to spend along the path, and estimated time for the drone to spend at each location.

In some embodiments, the prediction engine 294 may predict the battery usage with a battery capacity equation. For example, the prediction engine 294 may calculate the battery usage of the drone by multiplying the time the drone needs to complete the trip by the average current draw of the batter over the trip. For example, if the trip takes 0.25 hours and the battery draws 180 mA of current, the prediction engine 294 may predict that the drone will use 45 mAh of battery. If the battery has a capacity of 1000 mAh and a SoH of 90%, making the effective battery capacity 900 mAh, the prediction engine 294 may predict that the trip will use around 5% (45 mAh/900 mAh) of the battery. This approach works well when the prediction engine 294 knows the average current draw of the battery over the trip, for example if the drone draws a consistent amount of current no matter the action it is performing. However, each action performed by the drone may require a different amount current draw (e.g., a drone idling may require less power than a drone lifting a heavy load, and a drone moving slower may require less power than a drone moving faster). Moreover, small deviations from the planned path or instances where the drone may move to avoid collision may cause the drone to take more time, use more current, or use more power, resulting in different battery usage than predicted.

To account for the challenges with battery usage prediction, in some embodiments, the prediction engine 294 may use a machine learning model to predict battery usage for the requested trip of the drone. The prediction engine 294 may use a machine learning model trained to receive the planned path and path metadata as input and to output an estimated battery usage for the requested trip. Training data may include historical trip information, including historical paths and path metadata, labeled by the battery usage of the historical trip. The prediction engine 294 may calculate the battery usage of the historical trip based on historical log data (e.g., battery state logged in the memory 275 by the monitoring engine 292 during the time of the historical trip). For example, for a trip that took place from 5:00 am to 6:00 am, the prediction engine 294 may calculate the battery usage by subtracting the SoC of the battery logged at 6:00 am from the SoC of the battery logged at 5:00 am. In some embodiments, the prediction engine 294 may additionally label the historical trip with the SoH of the battery used in the trip.

The coordination engine 296 coordinates the use of batteries in a system of drones. For a trip requested by an administrator through the user device 170, the coordination engine 296 receives trip information. Trip information may include a battery usage prediction that the coordination engine 296 may receive from the prediction engine 294. Trip information may also include trip timing, such as a trip start time from the user device 170 and an estimated duration of the trip from the planner 250.

The coordination engine 296 may select a drone to complete the requested trip. For each drone, the coordination engine 296 may access trip timing for scheduled trips, trips that the coordination engine 296 previously selected the drone for. The coordination engine 296 may determine whether the scheduled trips of the drone overlap in time with the requested trip. In some embodiments, to make this determination, the coordination engine 296 may access trip information for the scheduled trip that has a start time closest to and before the start time of the requested trip. For example, say the requested trip has a start time of 9:25 am and the drone has three scheduled trips with start times at 9:00 am, 9:15 am, and 9:30 am. The coordination engine 296 may access the trip information for the scheduled trip with a start time of 9:15 am, as 9:15 am is before the requested start time of 9:25 am and is closer to 9:25 am than the start time of 9:00 am. The coordination engine 296 may predict a return timing of the drone, the return timing being the time at which the drone returns from the scheduled trip before the start time of the requested trip. To continue with the previous example, the coordination engine 296 may predict when the drone is scheduled to return from the scheduled trip starting at 9:15 am. The coordination engine 296 may simply add the estimated duration of the scheduled trip to the start time of the scheduled trip. So, if the estimated duration of the scheduled trip is 11 minutes, the return timing of the drone would be 9:15 am plus 11 minutes, or 9:26 am. If the estimated duration of the scheduled trip is 9 minutes, the return timing of the drone would be 9:15 am plus 9 minutes, or 9:24 am. Based on the return timing, the coordination engine 296 may determine whether the scheduled trips of the drone overlap with the requested trip. If the return timing is 9:26 am and the requested start time is 9:25 am, the coordination engine 296 determines that the scheduled trip overlaps with the requested trip and may refrain from selecting the drone for the trip. If the return timing is 9:24 am and the requested start time is 9:25 am, the coordination engine 296 determines that the scheduled trip does not overlap with the requested trip and may select the drone for the trip. The coordination engine 296 may perform a similar check to ensure that the end time of the requested trip does not overlap with the start time of any scheduled trips. The coordination engine 296 may compute the time the drone should return from the requested trip by adding the estimated duration of the requested trip to the start time of the requested trip. The coordination engine 296 may compare the predicted return timing to the start times of the drone's other scheduled trips.

The coordination engine 296 selects a battery to be used in the selected drone to complete the requested trip. For each battery, the coordination engine 296 may predict the state of the battery at the start time of the requested trip. In some embodiments, the coordination engine 296 may predict only some components of the battery state, such as what the SoC of the battery will be at the trip start time and whether the battery will be available at the trip start time. The coordination engine 296 predicts the state of the battery at the trip start time based on the battery's current state and on trip information (e.g., battery usage predicted by the prediction engine 294, trip start time, trip duration) for trips scheduled to use the battery between the current time and the trip start time. The coordination engine 296 may access the current battery state from the monitoring engine 292 or from memory 275. The coordination engine 296 may receive the predicted battery usage from the prediction engine 294. Based on the predicted battery state at the trip start time of the requested trip for each of the batteries, the coordination engine 296 may select a battery to use for the requested trip. For example, the coordination engine 296 may select a battery that is available at the trip start time over a battery that is unavailable. The coordination engine 296 may select a battery with a predicted SoC higher than the amount of battery the requested trip is predicted to use. In some embodiments, the coordination engine 296 may be unable to select a battery with a predicted SoC higher than the amount of battery the requested trip is predicted to use. In these embodiments, the coordination engine 296 may select a battery with predicted SoC lower than the amount of battery the scheduled trip is predicted to use so long as the charging engine 298 is able to charge the battery to the SoC level required. FIG. 7 illustrates an example scenario for battery selection for the coordination engine 296.

In some embodiments, the coordination engine 296 may be unable to select a battery or drone that is available from the requested start time for the duration of the requested trip. In some embodiments, the coordination engine 296 may be unable to select a battery that the charging engine 298 can charge to the SoC required for the requested trip before the requested start time. In these cases, the coordination engine 296 may notify the user that the requested trip is unable to be scheduled and ask the user to schedule the trip for another time. Alternatively, the coordination engine 296 may rearrange the scheduled trips to work around or to accommodate the requested trip.

The charging engine 298 may instruct the repowering unit 285 to charge or discharge the battery. The charging engine 298 may instruct the repowering unit 285 to charge the battery based on the SoC of the battery, the predicted battery usage of a requested trip, the trip start time, and the return timing of the drone. For example, say the coordination engine 296 selects a battery with a current SoC of 30% to be used for a trip predicted to use 40% battery, scheduled to start at 11:00 am. Say the coordination engine 296 selects a drone with a return time of 10:45 am. Based on the predicted battery usage of the requested trip, the charging engine 298 may instruct the repowering unit 285 to charge the battery to at least 40%. Responsive to detecting that the SoC of the battery is already 30%, the charging engine 298 may instruct the repowering unit 285 to charge the battery by at least 10%. The charging engine 298 may instruct the repowering unit to charge the battery by 10% between the return timing of the drone and the start time of the trip, or between 10:45 am and 11:00 am. The charging engine 298 may instruct the repowering unit 285 to charge the battery at a particular rate. For example, to charge the battery by 10% in 15 minutes, the charging engine 298 instructs the repowering unit 285 to charge the battery at a rate of 40% per hour. In an alternative example, the charging engine 298 may instruct the repowering unit 285 to charge the battery at a rate of 100% per hour, thus charging the battery by 10% in only 6 minutes. The charging engine 298 may instruct the repowering unit 285 to charge the battery within a particular time period (e.g., between 10:45 am and 11:00 am, from exactly 10:54 am to 11:00 am) or for a particular amount of time (e.g., within a 15-minute window, in exactly 6 minutes).

In some embodiments, the charging engine 298 may apply a restriction on the minimum battery level of the battery. For example, the charging engine 298 may apply a requirement that allows no drone to depart with a battery level less than 20%. Thus, for a trip requiring 40% battery, the charging engine 298 may instruct the repowering unit 285 to charge the battery to at least 60%. The charging engine 298 may instruct the repowering unit 285 to discharge the battery of the drone when the battery is not in use or has been in an idle state for a threshold amount of time. Discharging the battery when not in use may provide advantages, such as reducing the rate at which the SoH decreases, therefore extending the battery life of the battery.

In some embodiments, the charging engine 298 may instruct the repowering unit 285 to charge the battery of the drone based on a set of charging requirements, which may vary based on the battery state. Charging requirements may be requirements or limits on the current used to charge the battery. For example, a charging requirement may be that for a battery with battery pack voltage between 8V to 10V (or the cell voltage between 2V and 2.5V), the charging engine 298 should instruct the repowering unit to "precharge" the battery. Namely, the charging engine 298 should instruct the repowering unit 285 to charge the battery for a short period of time (e.g., 3 minutes) at a lower current rate than usual charging (e.g., 1.2 A instead of 12 A). Another charging requirement may be that for a battery with battery pack voltage between 10V and 17V, the charging engine 298 should instruct the repowering unit 285 to charge the battery with 12 A of current. Charging requirements may be limits on the temperature of the battery during charging. For example, a charging requirement may be that the battery cell surface temperature be between 10° C. and 45° C. Charging requirements may be limits on the time spent charging or on idle time. For example, a charging requirement may be that the voltage must rise to at least 10V within 3 minutes during precharging of the battery. A different charging requirement may be that, for a battery with idle time of one day, the charging engine 298 should instruct the repowering unit 285 to charge or discharge the battery to a SoC of 50% (e.g., cell voltage between roughly 3.65V and 3.75V). For a battery with idle time of seven days, the charging engine 298 should instruct the repowering unit 285 to charge or discharge the battery to 30% (e.g., cell voltage between 3.45V and 3.55V).

The repowering unit 285 repowers the battery of the drone according to the instructions of the charging engine 298 of the BME 290. In some embodiments, the repowering unit 285 may repower the battery while it is still in the drone. For example, the repowering unit 285 may charge the battery using wired charging to connect a power supply to the battery of the drone or may use inductive charging, such as an inductive coil under a landing or resting pad, to wirelessly power the battery inside the drone. In other embodiments, the repowering unit 285 may repower the battery outside of the drone. In these embodiments, the repowering unit 285 may remove the battery from the drone, for example by using mechanical actuators such as robotic arms. Other suitable ways to repower the drone are also possible.

Example Inventory Management Process

Figure 3:
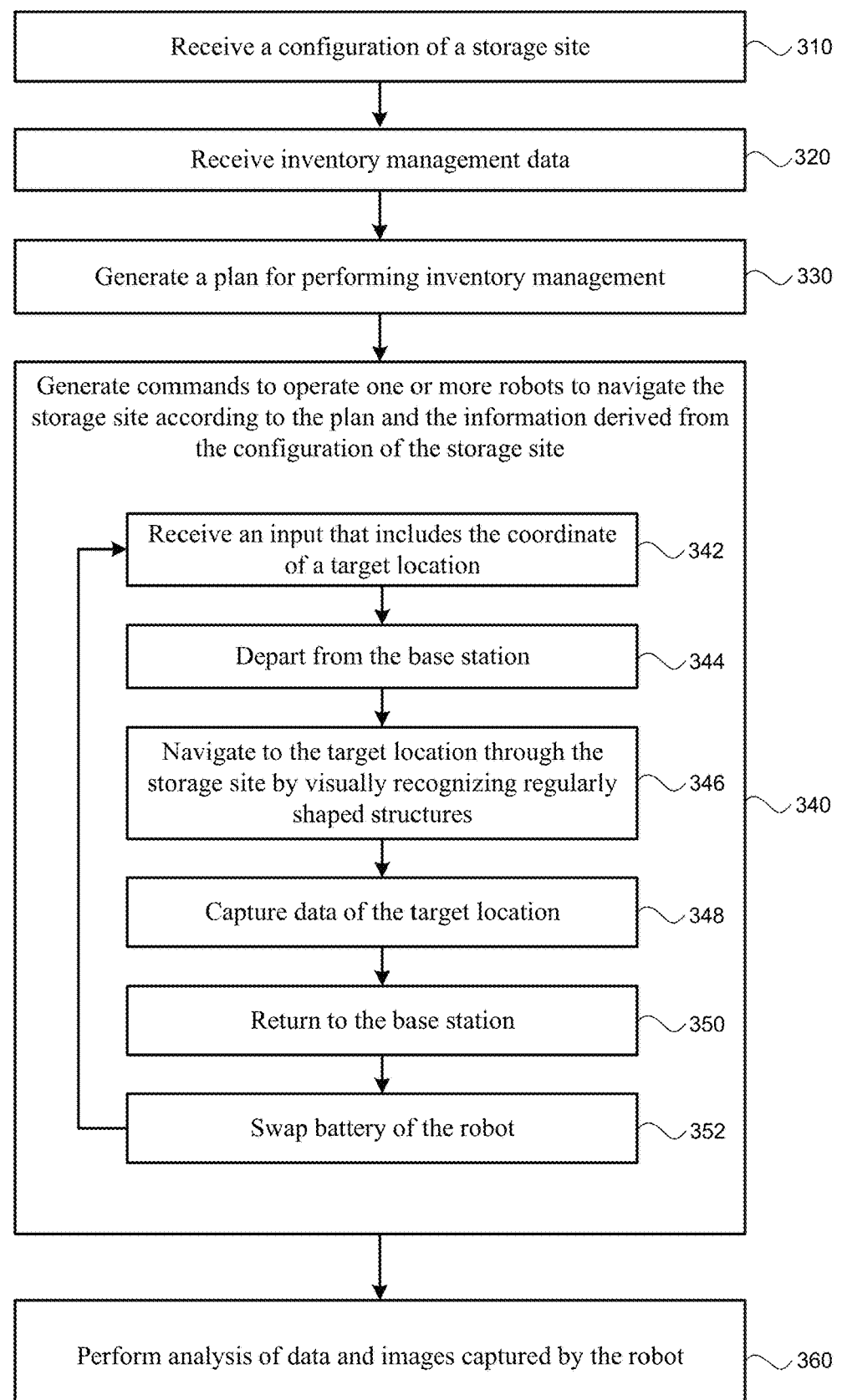
FIG. 3 is a flowchart that depicts an example process for managing the inventory of a storage site, according to an embodiment.

FIG. 3 is a flowchart that depicts an example process for managing the inventory of a storage site, according to an embodiment. The process may be implemented by a computer, which may be a single operation unit in a conventional sense (e.g., a single personal computer) or may be a set of distributed computing devices that cooperate to execute a set of instructions (e.g., a virtual machine, a distributed computing system, cloud computing, etc.). Also, while the computer is described in a singular form, the computer that performs the process in FIG. 3 may include more than one computer that is associated with the computing server 150, the inventory management system 140, the robot 120, the base station 130, or the user device 170.

According to an embodiment, the computer receives 310 a configuration of a storage site 110. The storage site 110 may be a warehouse, a retail store, or another suitable site. The configuration information of the storage site 110 may be uploaded to the robot 120 for the robot to navigate through the storage site 110. The configuration information may include a total number of the regularly shaped structures in the storage site 110 and dimension information of the regularly shaped structures. The configuration information provided may take the form of a computer-aided design (CAD) drawing or another type of file format. The configuration may include the layout of the storage site 110, such as the rack layout and placement of other regularly shaped structures. The layout may be a 2-dimensional layout. The computer extracts the number of sections, aisles, and racks and the number of rows and columns for each rack from the CAD drawing by counting those numbers as appeared in the CAD drawing. The computer may also extract the height and the width of the cells of the racks from the CAD drawing or from another source. In one embodiment, the computer does not need to extract the accurate distances between a given pair of racks, the width of each aisle, or the total length of the racks. Instead, the robot 120 may measure dimensions of aisles, racks, and cells from a depth sensor data or may use a counting method performed by the planner 250 in conjunction with the visual reference engine 240 to navigate through the storage site 110 by counting the number of rows and columns the robot 120 has passed. Hence, in some embodiments, the accurate dimensions of the racks may not be needed.

Some configuration information may also be manually inputted by an administrator of the storage site 110. For example, the administrator may provide the number of sections, the number of aisles and racks in each section, and the size of the cells of the racks. The administrator may also input the number of rows and columns of each rack.

Alternatively, or additionally, the configuration information may also be obtained through a mapping process such as a pre-flight mapping or a mapping process that is conducted as the robot 120 carries out an inventory management task. For example, for a storage site 110 that newly implements the automated management process, an administrator may provide the size of the navigable space of the storage site for one or more mapping robots to count the numbers of sections, aisles, rows and columns of the regularly shaped structures in the storage site 110. Again, in one embodiment, the mapping or the configuration information does not need to measure the accurate distance among racks or other structures in the storage site 110. Instead, a robot 120 may navigate through the storage site 110 with only a rough layout of the storage site 110 by counting the regularly shaped structures along the path in order to identify a target location. The robotic system may gradually perform mapping or estimation of scales of various structures and locations as the robot 120 continues to perform various inventory management tasks.

The computer receives 320 inventory management data for inventory management operations at the storage site 110. Certain inventory management data may be manually inputted by an administrator while other data may be downloaded from the inventory management system 140. The inventory management data may include scheduling and planning for inventory management operations, including the frequency of the operations, time window, etc. For example, the management data may specify that each location of the racks in the storage site 110 is to be scanned every predetermined period (e.g., every day) and the inventory scanning process is to be performed in the evening by the robot 120 after the storage site is closed. The data in the inventory management system 140 may provide the barcodes and labels of items, the correct coordinates of the inventory, information regarding racks and other storage spaces that need to be vacant for incoming inventory, etc. The inventory management data may also include items that need to be retrieved from the storage site 110 (e.g., items on purchase orders that need to be shipped) for each day so that the robot 120 may need to focus on those items.

The computer generates 330 a plan for performing inventory management. For example, the computer may generate an automatic plan that includes various commands to direct the robot 120 to perform various scans. The commands may specify a range of locations that the robot 120 needs to scan or one or more specific locations that the robot 120 needs to go. The computer may estimate the time for each scanning trip and design the plan for each operation interval based on the available time for the robotic inventory management. For example, in certain storage sites 110, robotic inventory management is not performed during the business hours.

The computer generates 340 various commands to operate one or more robots 120 to navigate the storage site 110 according to the plan and the information derived from the configuration of the storage site 110. The robot 120 may navigate the storage site 110 by at least visually recognizing the regularly shaped structures in the storage sites and counting the number of regularly shaped structures. In one embodiment, in addition to the localization techniques such as VIO used, the robot 120 counts the number of racks, the number of rows, and the number of columns that it has passed to determine its current location along a path from a starting location to a target location without knowing the accurate distance and direction that it has traveled.

The scanning of inventory or other inventory management tasks may be performed autonomously by the robot 120. In one embodiment, a scanning task begins at a base station at which the robot 120 receives 342 an input that includes coordinates of target locations in the storage site 110 or a range of target locations. The robot 120 departs 344 from the base station 130. The robot 120 navigates 346 through the storage site 110 by visually recognizing regularly shaped structures. For example, the robot 120 tracks the number of regularly shaped structures that are passed by the robot 120. The robot 120 makes turns and translation movements based on the recognized regularly shaped structures captured by the robot's image sensor 210. Upon reaching the target location, the robot 120 may align itself with a reference point (e.g., the center location) of the target location. At the target location, the robot 120 captures 348 data (e.g., measurements, pictures, etc.) of the target location that may include the inventory item, barcodes, and labels on the boxes of the inventory item. If the initial command before the departure of the robot 120 includes multiple target locations or a range of target locations, the robot 120 continues to the next target locations by moving up, down, or sideways to the next location to continue to scanning operation.

Upon completion of a scanning trip, the robot 120 returns 350 to the base station 130 by counting the number of regularly shaped structures that the robot 120 has passed, in a reversed direction. The robot 120 may potentially recognize the structures that the robot has passed when the robot 120 travels to the target location. Alternatively, the robot 120 may also return to the base station 130 by reversing the path without any count. The base station 130 repowers the robot

120. For example, the base station 130 swaps 352 the battery of the robot 120 so that the robot 120 can quickly return to service for another trip. The used batteries may be charged at the base station 130. The base station 130 also may download the data and images captured by the robot 120 and upload the data and images to the data store 160 for further process. Alternatively, the robot 120 may include a wireless communication component to send its data and images to the base station 130 or directly to the network 180.

The computer performs 360 analyses of the data and images captured by the robot 120. For example, the computer may compare the barcodes (including serial numbers) in the images captured by the robot 120 to the data stored in the inventory management system 140 to identify if any items are misplaced or missing in the storage site 110. The computer may also determine other conditions of the inventory. The computer may generate a report to display at the user interface 175 for the administrator to take remedial actions for misplaced or missing inventory. For example, the report may be generated daily for the personnel in the storage site 110 to manually locate and move the misplaced items. Alternatively, or additionally, the computer may generate an automated plan for the robot 120 to move the misplaced inventory. The data and images captured by the robot 120 may also be used to confirm the removal or arrival of inventory items.

Example Navigation Process

Figure 4:
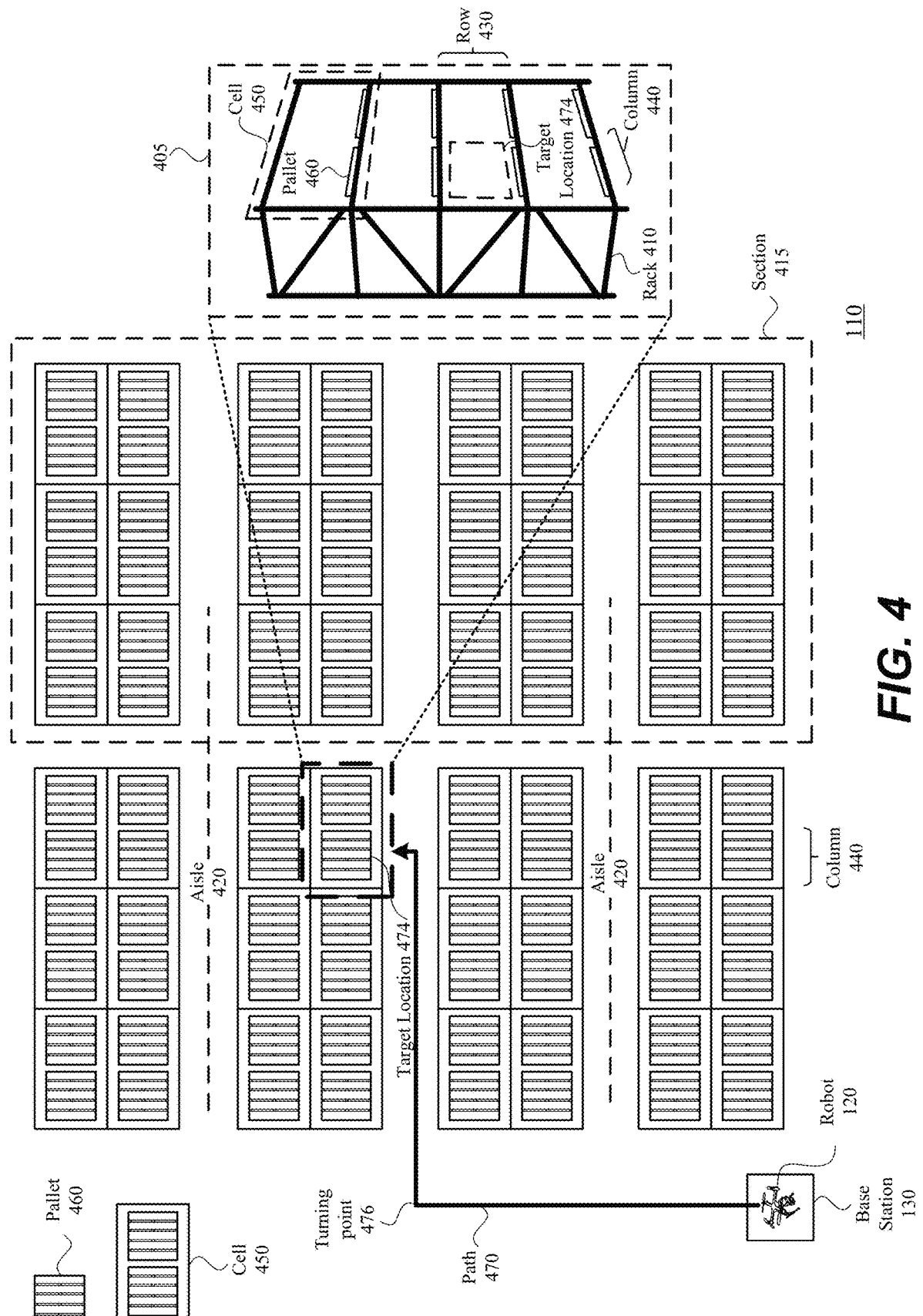
FIG. 4 is a conceptual diagram of an example layout of a storage site that is equipped with a robot, according to an embodiment.

FIG. 4 is a conceptual diagram of an example layout of a storage site 110 that is equipped with a robot 120, according to an embodiment. FIG. 4 shows a two-dimensional layout of storage site 110 with an enlarged view of an example rack that is shown in inset 405. The storage site 110 may be divided into different regions based on the regularly shaped structures. In this example, the regularly shaped structures are racks 410. The storage site 110 may be divided by sections 415, aisles 420, rows 430 and columns 440. For example, a section 415 is a group of racks. Each aisle may have two sides of racks. Each rack 410 may include one or more columns 440 and multiple rows 430. The storage unit of a rack 410 may be referred to as a cell 450. Each cell 450 may carry one or more pallets 460. In this particular example, two pallets 460 are placed on each cell 450. Inventory of the storage site 110 is carried on the pallets 460. The divisions and nomenclature illustrated in FIG. 4 are used as examples only. A storage site 110 in another embodiment may be divided in a different manner.

Each inventory item in the storage site 110 may be located on a pallet 460. The target location (e.g., a pallet location) of the inventory item may be identified using a coordinate system. For example, an item placed on a pallet 460 may have an aisle number (A), a rack number (K), a row number (R), and a column number (C). For example, a pallet location coordinate of [A3, K1, R4, and C5] means that the pallet 460 is located at a rack 410 in the third aisle and the north rack. The location of the pallet 460 in the rack 410 is in the fourth row (counting from the ground) and the fifth column. In some cases, such as the particular layout shown in FIG. 4, an aisle 420 may include racks 410 on both sides. Additional coordinate information may be used to distinguish the racks 410 at the north side and the racks 410 at the south side of an aisle 420. Alternatively, the top and bottom sides of the racks can have different aisle numbers. For a spot check, a robot 120 may be provided with a single coordinate if only one spot is provided or multiple coordinates if more than one spot is provided. For a range scan that checks a range of pallets 460, the robot 120 may be provided with a range of coordinates, such as an aisle number, a rack number, a starting row, a starting column, an ending row, and an ending column. In some embodiments, the coordinate of a pallet location may also be referred in a different manner. For example, in one case, the coordinate system may take the form of "aisle-rack-shelf-position." The shelf number may correspond to the row number and the position number may correspond to the column number.

Figure 5:
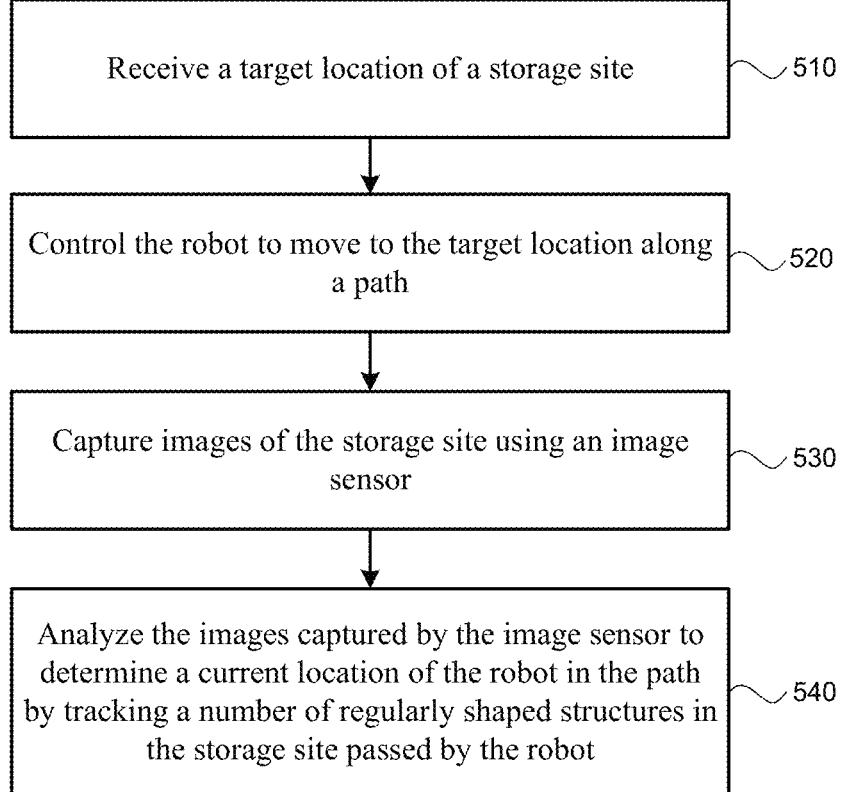
FIG. 5 is a flowchart depicting an example navigation process of a robot, according to an embodiment.

Referring to FIG. 5 in conjunction with FIG. 4, FIG. 5 is a flowchart depicting an example navigation process of a robot 120, according to an embodiment. The robot 120 receives 510 a target location 474 of a storage site 110. The target location 474 may be expressed in the coordinate system as discussed above in association with FIG. 4. The target location 474 may be received as an input command from a base station 130. The input command may also include the action that the robot 120 needs to take, such as taking a picture at the target location 474 to capture the barcodes and labels of inventory items. The robot 120 may rely on the VIO unit 236 and the altitude estimator 238 to generate localization information. In one case, the starting location of a route is the base station 130. In some cases, the starting location of a route may be any location at the storage site 110. For example, the robot 120 may have recently completed a task and started another task without returning to the base station 130.

The processors of the robot 120, such as the one executing the planner 250, control 520 the robot 120 to the target location 474 along a path 470. The path 470 may be determined based on the coordinate of the target location 474. The robot 120 may turn so that the image sensor 210 is facing the regularly shaped structures (e.g., the racks). The movement of the robot 120 to the target location 474 may include traveling to a certain aisle, taking a turn to enter the aisle, traveling horizontally to the target column, traveling vertically to the target row, and turning to the right angle facing the target location 474 to capture a picture of inventory items on the pallet 460.

As the robot 120 moves to the target location 474, the robot 120 captures 530 images of the storage site 110 using the image sensor 210. The images captured may be in a sequence of images. The robot 120 receives 540 the images captured by the image sensor 210 as the robot 120 moves along the path 470. The images may capture the objects in the environment, including the regularly shaped structures such as the racks. For example, the robot 120 may use the algorithms in the visual reference engine 240 to visually recognize the regularly shaped structures.

The robot 120 analyzes 550 the images captured by the image sensor 210 to determine the current location of the robot 120 in the path 470 by tracking the number of regularly shaped structures in the storage site passed by the robot 120. The robot 120 may use various image processing and object recognition techniques to identify the regularly shaped structures and to track the number of structures that the robot 120 has passed. Referring to the path 470 shown in FIG. 4, the robot 120, facing the racks 410, may travel to the turning point 476. The robot 120 determines that it has passed two racks 410 so it has arrived at the target aisle. In response, the robot 120 turns counterclockwise and enter the target aisle facing the target rack. The robot 120 counts the number of columns that it has passed until the robot 120 arrives at the target column. Depending on the target row, the robot 120 may travel vertically up or down to reach the target location. Upon reaching the target location, the robot 120 performs the action specified by the input command, such as taking a picture of the inventory at the target location.

Example Battery Management

Figure 6:
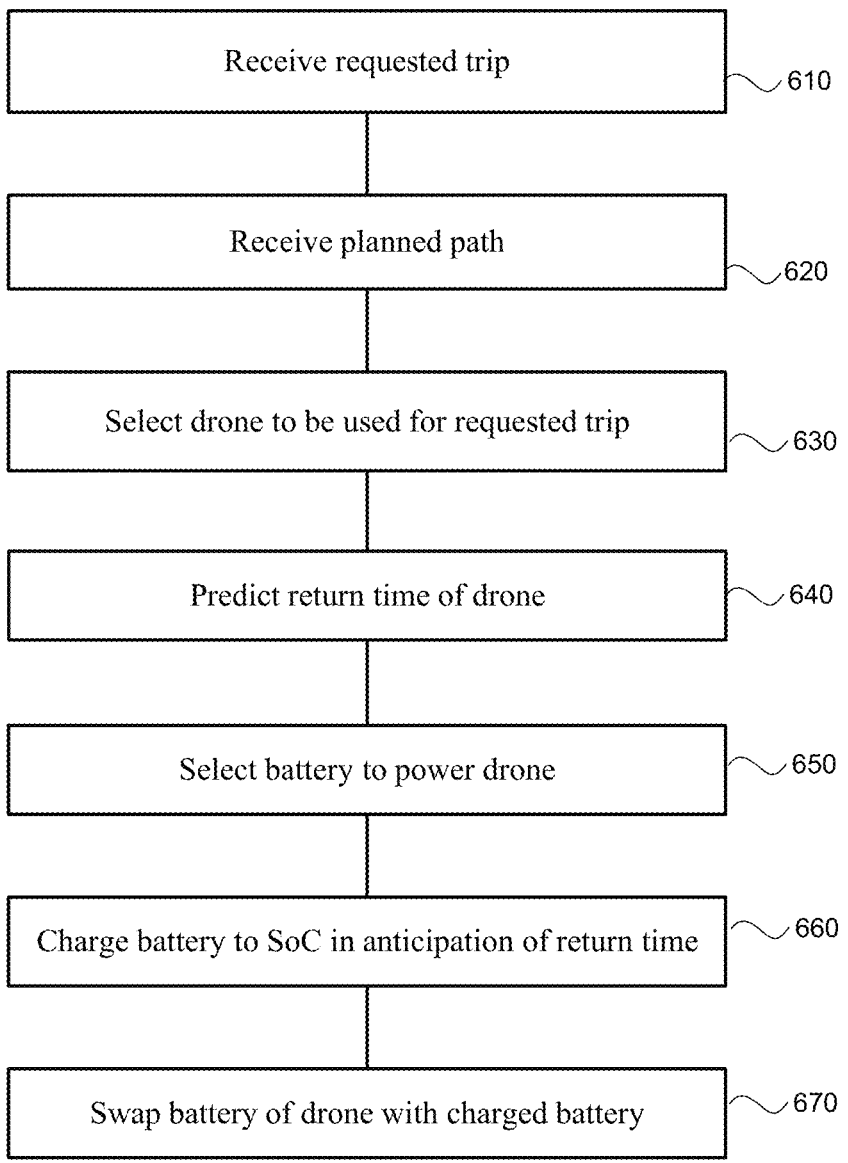
FIG. 6 is a flowchart depicting an example process for battery swapping performed by a base station, according to an embodiment.

FIG. 6 is a flowchart depicting an example process for battery swapping performed by a base station, according to some embodiments. While the example process is described as performed by the base station 130, one or more steps of the process may be performed by the computing server 150, the inventory management system 140, the drone, or the user device 170.

The base station 130 receives 610 a requested trip from a user device 170. The requested trip may include a series of tasks for the drone to perform. The requested trip may include an order for the drone to perform the tasks, locations of the tasks, and a time for the trip to start (e.g., a trip start time).

The base station 130 transmits the requested trip to planner 250 and receives 620 a planned path and path metadata from the planner 250. Path metadata may include data such as path length, locations along the path (e.g., starting location, end location, and target locations), actions corresponding to each location, speeds of the drone along each segment of the path, estimated time for the drone to spend along the path, estimated time for the drone to spend at each location, and estimated duration of the trip. For a system with multiple drones, the base station 130 may receive a planned path from a planner 250 associated with any of the drones, regardless of whether the drone receiving the requested trip will ultimately perform the requested trip.

The base station 130 selects 630 a drone to be used for the requested trip based on the trip start time (e.g., received from the user device 170) and the estimated duration of the requested trip (e.g., received from the planner 250). Additional details of selecting a drone are described in the discussion of the coordination engine 296.

The base station 130 predicts 640 a return time of the selected drone, the time at which the drone returns from the scheduled trip before the start time of the requested trip. The base station 130 may predict the return time based on the start time and estimated duration of the trip scheduled closest to and before the requested trip. Additional details of predicting the return time are described in the discussion of the coordination engine 296.

The base station 130 selects 650 a battery to power the selected drone. In selecting a battery, the base station 130 predicts a state of each battery at the start time of the requested trip. The base station 130 may predict the state of each battery at the start time of the requested trip based on the current state for each battery as well as battery usage, trip start time, and trip duration for trips scheduled to use the battery between the current time and the trip start time. Additional details of selecting a battery are described in the discussion of the coordination engine 296.

The base station 130 charges 660 the battery to an SoC. In some embodiments, the base station 130 charges the battery to an SoC such that the SoC meets or exceeds the predicted battery usage for the requested trip. In some embodiments, the base station 130 charges the battery to an SoC in anticipation of the return time of the selected drone, for example either partially or fully charging the battery before the return time. In some embodiments, the base station charges the battery to an SoC in anticipation of the start time of the requested trip. Additional details of charging the battery are described in the discussion of the charging engine 298.

The base station 130 swaps 670 the battery of the selected drone with the charged battery. In some embodiments, the base station 130 swaps the battery of the selected drone with the charged battery subsequent to the selected drone returning to the base station 130 at the return time. In some embodiments, the base station 130 swaps the battery of the selected drone with the charged battery at or before the start time of the requested trip. Additional details of swapping the battery are described in the discussion of the repowering unit 285.

Figure 7A:
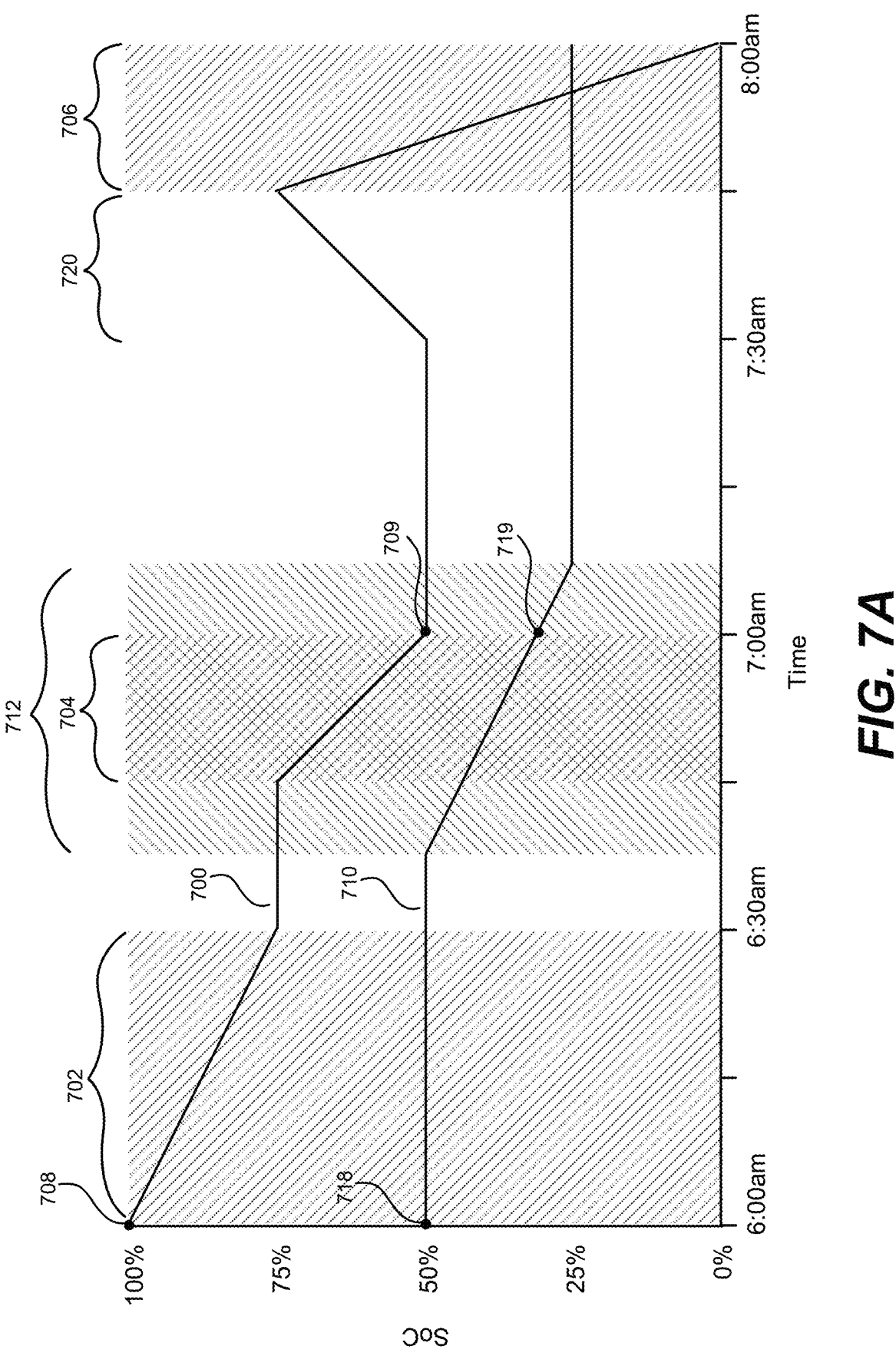
FIGS. 7A-C depict an example system of two batteries, according to an embodiment.

FIG. 7A depicts an example system of two batteries, shown by the two lines. A first battery 700 starts with an SoC of 100% at 6:00 am. Within two hours, from 6:00-8:00 am, the first battery 700 is in use for three scheduled trips. A first trip 702 scheduled from 6:00-6:30 am is predicted to use 25% of the battery. A second trip 704 from 6:45-7:00 am is predicted to use 25% of the battery. A third trip 706 from 7:45-8:00 am is predicted to use 75% of the battery. On the plot, each trip is represented as a downward sloping line segment. In a charging period 720 that takes place between 7:30-7:45 am, the base station 130 is scheduled to charge the first battery 700 from 50% SoC to 75% SoC. A second battery 710 starts with a SoC of 50% at 6:00 am. Between 6:00-8:00 am, the second battery 710 is in use for one scheduled trip 712, a 30-minute trip from 6:35-7:05 am, predicted to use 25% of the battery. The time windows where the batteries are in use are represented as shaded regions, where an overlapping shaded region indicates that both batteries are in use (e.g., during trip 704 and 712).

To continue with an example scenario, say the coordination engine 296 receives, at 6:00 am, trip information for a trip scheduled to start at 7:00 am, set to last for 30 minutes, and predicted to use 25% of the battery. Responsive to receiving the trip information, the coordination engine 296 accesses the battery state at 6:00 am for each of the batteries. The first battery 700 has battery state 708. Battery state 708 indicates that the first battery 700 has a SoC of 100% and is in use. The second battery 710 has battery state 718. Battery state 718 indicates that the second battery 710 has a SoC of 50% and is not in use. The coordination engine 296 predicts the state of each battery at 7:00 am. The first battery 700 has a predicted battery state 709. As the first battery 700 has two trips scheduled before 7:00 am with a total battery usage for the trips of 50%, the coordination engine predicts that the SoC of the first battery 700 will be 50% at 7:00 am, as indicated by battery state 709. The coordination engine 296 may also predict that the battery will not be in use at 7:00 am, as no scheduled trips for the first battery 700 take place at 7:00 am. The second battery 710 has a predicted battery state 719. For the second battery 710, the coordination engine 296 may predict that the battery will be in use at 7:00 am, as a trip is scheduled for the second battery 710 between 6:35-7:05 am. Moreover, the coordination engine 296 may predict that the SoC of the second battery 710 will be somewhere between 50% and 25%, based on the second battery's starting SoC (50%) and the predicted battery usage for the trip (25%). In some embodiments, the coordination engine 296 may assume that the rate of battery loss is linear and predict that the second battery's SoC be 31.25% at 7:00 am.

Responsive to determining the battery state for each battery at 7:00 am (battery states 709 and 719), the coordination engine 296 may select a battery for the trip scheduled to start at 7:00 am, set to last for 30 minutes, and predicted to use 25% of the battery. As the second battery 710 is in use at 7:00 am, the coordination engine 296 determines that the second battery 710 cannot be used for the trip. The coordination engine 296 selects the first battery 700 to perform the trip because the battery is not in use at 7:00 am and has an SoC greater than the 25% that is predicted to be used on the trip. In some embodiments, the coordination engine 296 may need to check that the SoC of the battery at the trip start time is greater than the sum of the predicted battery use and a threshold battery requirement. For example, if the threshold battery requirement is 20% SoC and the trip is predicted to use 25% battery, the SoC at the start of the trip must be at least 45%. The coordination engine 296 may also need to check that the length of the trip does not overlap with future scheduled trips. For example, the coordination engine 296 checks that the scheduled 30-minute trip at 7:00 am does not overlap with the 15-minute trip at 7:45 am.

Figure 7B:
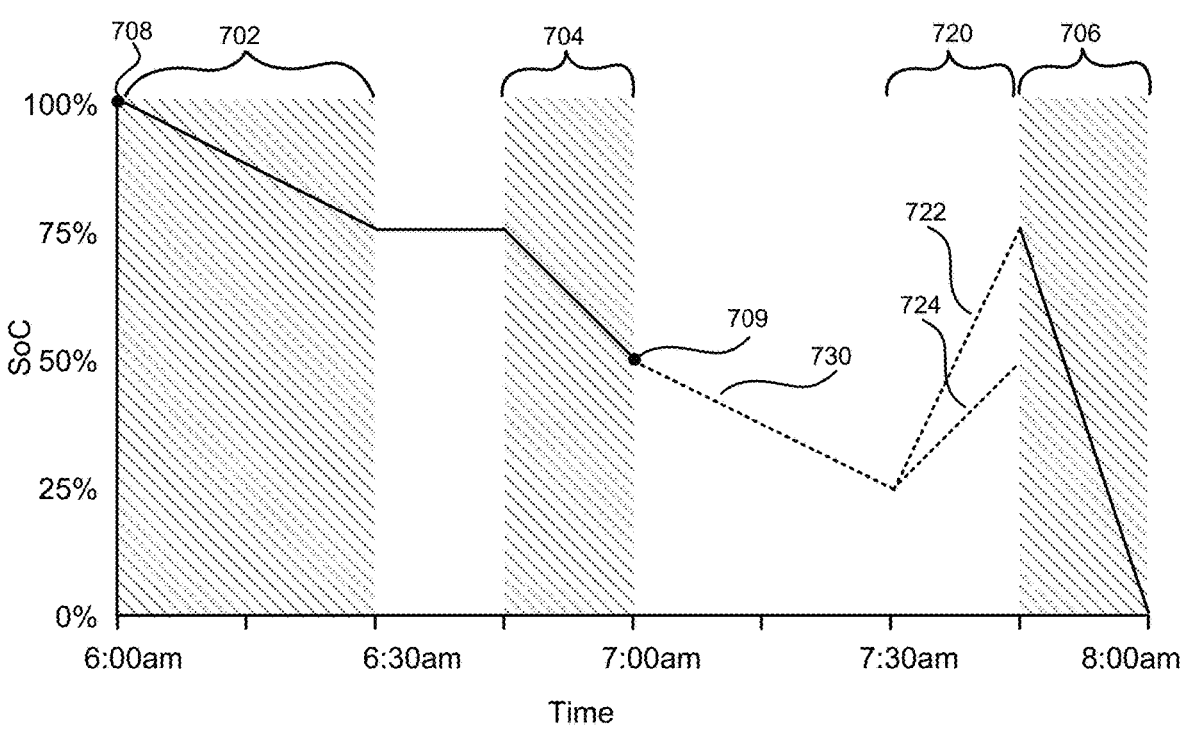

In some embodiments, the coordination engine 296 may check that the SoC at the end of the scheduled trip is compatible with any future trips. FIG. 7B shows the scheduled trip 730. If the coordination engine 296 were to schedule the trip 730 as shown, starting at 7:00 am with 50% SoC and ending at 7:30 am with 25% SoC, the coordination engine 296 would need to communicate to the charging engine 298 such that the battery gets charged from 25% to 75% during charging period 720 in order to account for the SoC required by trip 706. This means that the charging engine 298 would need to charge the battery at a rate of 200% per hour, as shown by the line segment 722.

However, say the charger has a maximum charging rate of 100% per hour, as shown by the line segment 724. In this situation, the battery would only be able to be charged to 50% by 7:45 am, leaving the first battery 700 with an SoC too low to complete trip 706. Because the second trip 704 leaves the first battery 700 with 50% SoC at 7:00 am and the third trip 706 requires at least 75% SoC, unless the battery gets recharged during the time periods when it is not in use (e.g., 6:30-6:45 am or 7:00-7:45 am), the battery will not have enough charge to make the third trip.

Figure 7C:
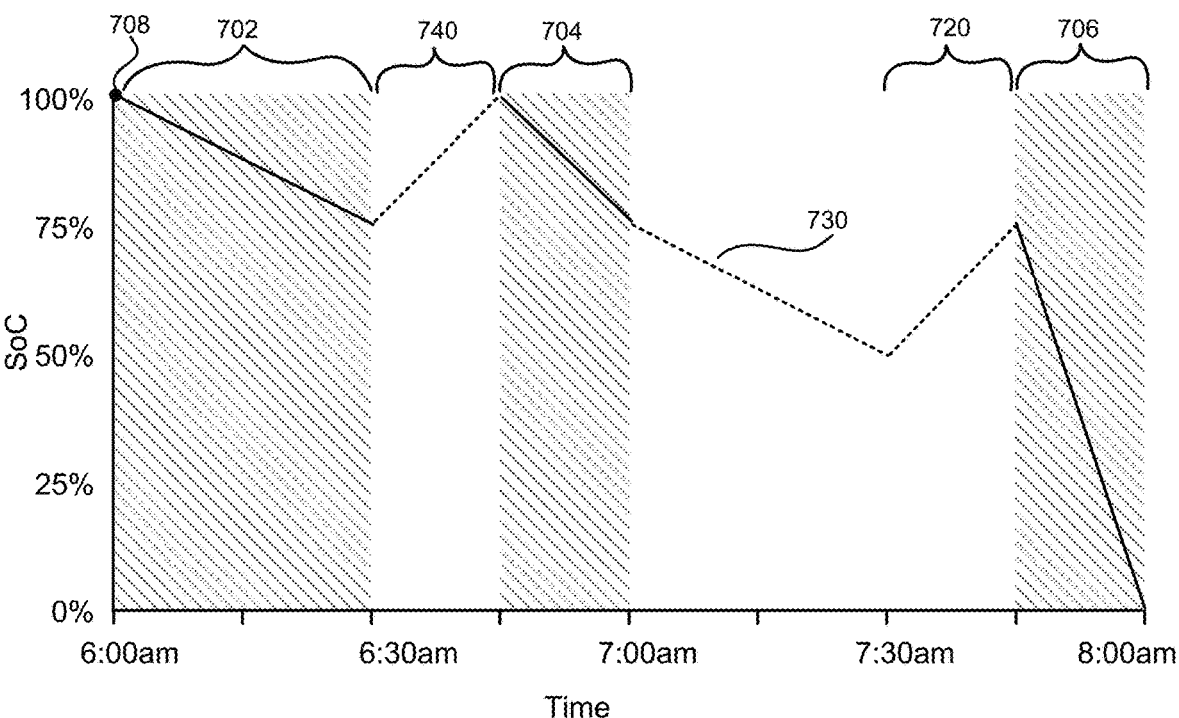

FIG. 7C shows an alternative charging schedule that remedies the problem shown in FIG. 7B, where charging at a rate of 100% per hour between 7:30-7:45 am leaves the first battery 700 unable to complete the third trip 706. In FIG. 7C, the charging engine 298 charges the battery 700 at a rate of 100% per hour between two charging periods instead of one. The charging engine 298 charges the first battery 700 by 25% during charging period 740 between 6:30 am and 6:45 am and by 25% during charging period 720 between 7:30 am and 7:45 am. With this charging schedule, the charging engine 298 ensures that the first battery 700 has SoC of 75% at 7:45 am before the third trip 706.

Example Machine Learning Models

In various embodiments, a wide variety of machine learning techniques may be used. Examples include different forms of supervised learning, unsupervised learning, and semi-supervised learning such as decision trees, support vector machines (SVMs), regression, Bayesian networks, and genetic algorithms. Deep learning techniques such as neural networks, including convolutional neural networks (CNN), recurrent neural networks (RNN) and long short-term memory networks (LSTM), may also be used. For example, the process of image segmentation, various object recognition, localization, and other processes may apply one or more machine learning and deep learning techniques. In one embodiment, image segmentation is performed using a CNN, whose example structure is shown in FIG. 8.

In various embodiments, the training techniques for a machine learning model may be supervised, semi-supervised, or unsupervised. In supervised learning, the machine learning models may be trained with a set of training samples that are labeled. For example, for a machine learning model trained to predict battery depletion time, the training samples may be history battery usage data of a drone and the routes of the drone. The labels for each training sample may be binary or multi-class. In training a machine learning model for predicting battery usage, the training samples may be minutes of battery life time, battery level, routes and tasks performed during the trip. In some cases, an unsupervised learning technique may be used. The samples used in training are not labeled. Various unsupervised learning technique such as clustering may be used. In some cases, the training may be semi-supervised with training set having a mix of labeled samples and unlabeled samples.

A machine learning model may be associated with an objective function, which generates a metric value that describes the objective goal of the training process. For example, the training may intend to reduce the error rate of the model in generating predictions. In such a case, the objective function may monitor the error rate of the machine learning model. In object recognition (e.g., object detection and classification), the objective function of the machine learning algorithm may be the training error rate in classifying objects in a training set. Such an objective function may be called a loss function. Other forms of objective functions may also be used, particularly for unsupervised learning models whose error rates are not easily determined due to the lack of labels. In image segmentation, the objective function may correspond to the difference between the model's predicted segments and the manually identified segments in the training sets. In various embodiments, the error rate may be measured as cross-entropy loss, L1 loss (e.g., the sum of absolute differences between the predicted values and the actual value), L2 loss (e.g., the sum of squared distances).

Figure 8:
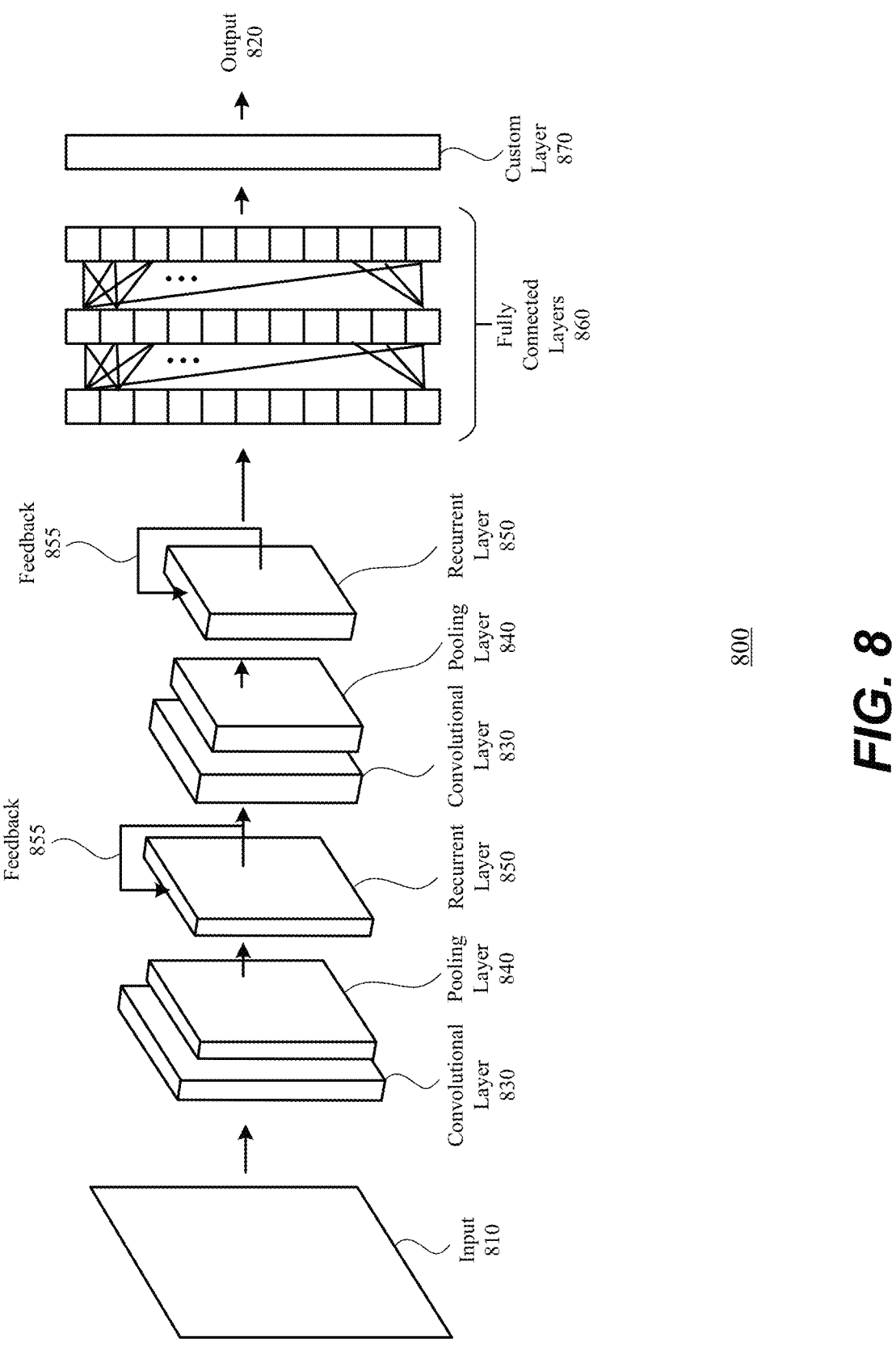
FIG. 8 is a block diagram illustrating an example machine learning model, according to an embodiment.

Referring to FIG. 8, a structure of an example CNN is illustrated, according to an embodiment. The CNN 800 may receive an input 810 and generate an output 820. The CNN 800 may include different kinds of layers, such as convolutional layers 830, pooling layers 840, recurrent layers 850, full connected layers 860, and custom layers 870. A convolutional layer 830 convolves the input of the layer (e.g., an image) with one or more kernels to generate different types of images that are filtered by the kernels to generate feature maps. Each convolution result may be associated with an activation function. A convolutional layer 830 may be followed by a pooling layer 840 that selects the maximum value (max pooling) or average value (average pooling) from the portion of the input covered by the kernel size. The pooling layer 840 reduces the spatial size of the extracted features. In some embodiments, a pair of convolutional layer 830 and pooling layer 840 may be followed by a recurrent layer 850 that includes one or more feedback loop 855. The feedback 855 may be used to account for spatial relationships of the features in an image or temporal relationships of the objects in the image. The layers 830, 840, and 850 may be followed in multiple fully connected layers 860 that have nodes (represented by squares in FIG. 8) connected to each other. The fully connected layers 860 may be used for classification and object detection. In one embodiment, one or more custom layers 870 may also be presented for the generation of a specific format of output 820. For example, a custom layer may be used for image segmentation for labeling pixels of an image input with different segment labels.

The order of layers and the number of layers of the CNN 800 in FIG. 8 is for example only. In various embodiments, a CNN 800 includes one or more convolutional layer 830 but may or may not include any pooling layer 840 or recurrent layer 850. If a pooling layer 840 is present, not all convolutional layers 830 are always followed by a pooling layer 840. A recurrent layer may also be positioned differently at other locations of the CNN. For each convolutional layer 830, the sizes of kernels (e.g., 3×3, 5×5, 7×7, etc.) and the numbers of kernels allowed to be learned may be different from other convolutional layers 830.

A machine learning model may include certain layers, nodes, kernels and/or coefficients. Training of a neural network, such as the CNN 800, may include forward propagation and backpropagation. Each layer in a neural network may include one or more nodes, which may be fully or partially connected to other nodes in adjacent layers. In forward propagation, the neural network performs the computation in the forward direction based on outputs of a preceding layer. The operation of a node may be defined by one or more functions. The functions that define the operation of a node may include various computation operations such as convolution of data with one or more kernels, pooling, recurrent loop in RNN, various gates in LSTM, etc. The functions may also include an activation function that adjusts the weight of the output of the node. Nodes in different layers may be associated with different functions.

Each of the functions in the neural network may be associated with different coefficients (e.g., weights and kernel coefficients) that are adjustable during training. In addition, some of the nodes in a neural network may also be associated with an activation function that decides the weight of the output of the node in forward propagation. Common activation functions may include step functions, linear functions, sigmoid functions, hyperbolic tangent functions (tanh), and rectified linear unit functions (ReLU). After an input is provided into the neural network and passes through a neural network in the forward direction, the results may be compared to the training labels or other values in the training set to determine the neural network's performance. The process of prediction may be repeated for other images in the training sets to compute the value of the objective function in a particular training round. In turn, the neural network performs backpropagation by using gradient descent such as stochastic gradient descent (SGD) to adjust the coefficients in various functions to improve the value of the objective function.

Multiple rounds of forward propagation and backpropagation may be performed. Training may be completed when the objective function has become sufficiently stable (e.g., the machine learning model has converged) or after a predetermined number of rounds for a particular set of training samples. The trained machine learning model can be used for performing prediction, such as predicting how long a battery on a drone will last given the routes and tasks planned.

Computing Machine Architecture

Figure 9:
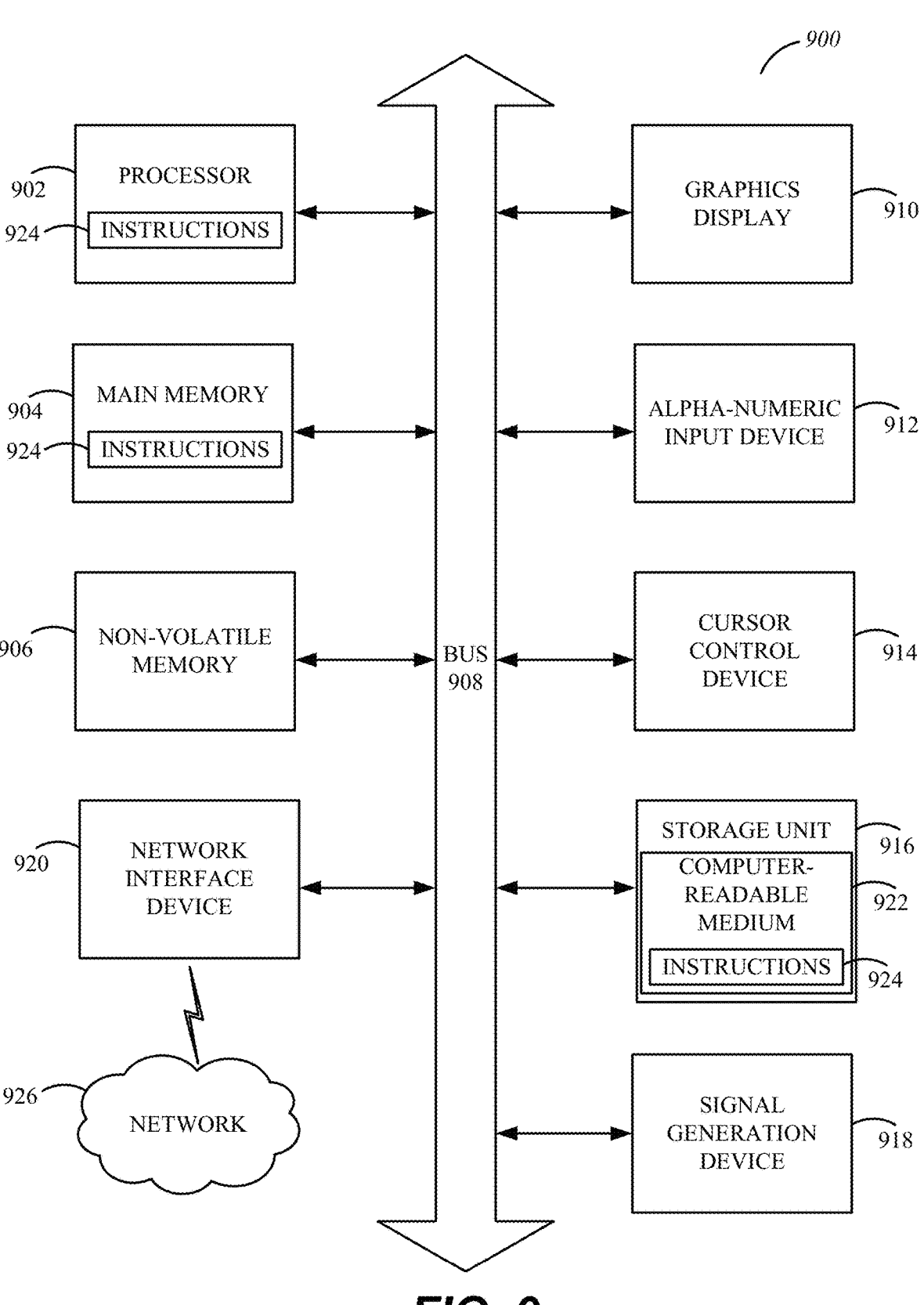
FIG. 9 is a block diagram illustrating components of an example computing machine, according to an embodiment.

FIG. 9 is a block diagram illustrating components of an example computing machine that is capable of reading instructions from a computer-readable medium and execute them in a processor (or controller). A computer described herein may include a single computing machine shown in FIG. 9, a virtual machine, a distributed computing system that includes multiples nodes of computing machines shown in FIG. 9, or any other suitable arrangement of computing devices.

By way of example, FIG. 9 shows a diagrammatic representation of a computing machine in the example form of a computer system 900 within which instructions 924 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a network deployment, the machine may operate in the capacity of a server machine or a client machine in a server-client network environment, or as a peer machine in a peer-to-peer (or distributed) network environment.

The structure of a computing machine described in FIG. 9 may correspond to any software, hardware, or combined components shown in FIGS. 1 and 2, including but not limited to, the inventory management system 140, the computing server 150, the data store 160, the user device 170, and various engines, modules, interfaces, terminals, and machines shown in FIG. 2. While FIG. 9 shows various hardware and software elements, each of the components described in FIGS. 1 and 2 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 924 that specify actions to be taken by that machine. Further, while only a single machine is illustrated, the term "machine" shall also be taken to include any collection of machines that individually or jointly execute instructions 924 to perform any one or more of the methodologies discussed herein.

The example computer system 900 includes one or more processors (generally, processor 902) (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 904, and a non-volatile memory 906, which are configured to communicate with each other via a bus 908. The computer system 900 may further include graphics display unit 910 (e.g., a plasma display panel (PDP), a liquid crystal display (LCD), a projector, or a cathode ray tube (CRT)). The computer system 900 may also include alphanumeric input device 912 (e.g., a keyboard), a cursor control device 914 (e.g., a mouse, a trackball, a joystick, a motion sensor, or other pointing instrument), a storage unit 916, a signal generation device 918 (e.g., a speaker), and a network interface device 920, which also are configured to communicate via the bus 908.

The storage unit 916 includes a computer-readable medium 922 on which is stored instructions 924 embodying any one or more of the methodologies or functions described herein. The instructions 924 may also reside, completely or at least partially, within the main memory 904 or within the processor 902 (e.g., within a processor's cache memory) during execution thereof by the computer system 900, the main memory 904 and the processor 902 also constituting computer-readable media. The instructions 924 may be transmitted or received over a network 926 via the network interface device 920.

While computer-readable medium 922 is shown in an example embodiment to be a single medium, the term "computer-readable medium" should be taken to include a single medium or multiple media (e.g., a centralized or distributed database, or associated caches and servers) able to store instructions (e.g., instructions 924). The computer-readable medium may include any medium that is capable of storing instructions (e.g., instructions 924) for execution by the machine and that cause the machine to perform any one or more of the methodologies disclosed herein. The computer-readable medium may include, but not be limited to, data repositories in the form of solid-state memories, optical media, and magnetic media. The computer-readable medium does not include a transitory medium such as a signal or a carrier wave.

Additional Configuration Considerations

Beneficially, by recognizing regularly shaped structures in a storage site and use the count of the structures to navigate through the storage site, the robotic system automatizes a storage site without adding significant overhead to the storage site. Conventional robots often require code markings such as QR codes that are placed at each rack to recognize the racks in order to navigate through the storage site. However, the addition of QR codes in a storage site imposes a significant upfront cost on a conventional storage site to become automatized. Also, the use of QR codes presents continuous maintenance costs for the storage site. The use of a robotic system in some of the embodiments may allow robots to navigate through a storage site without prior mapping.

Certain embodiments are described herein as including logic or a number of components, engines, modules, or mechanisms. Engines may constitute either software modules (e.g., code embodied on a computer-readable medium) or hardware modules. A hardware engine is a tangible unit capable of performing certain operations and may be configured or arranged in a certain manner. In example embodiments, one or more computer systems (e.g., a standalone, client or server computer system) or one or more hardware engines of a computer system (e.g., a processor or a group of processors) may be configured by software (e.g., an application or application portion) as a hardware engine that operates to perform certain operations as described herein.

In various embodiments, a hardware engine may be implemented mechanically or electronically. For example, a hardware engine may comprise dedicated circuitry or logic that is permanently configured (e.g., as a special-purpose processor, such as a field programmable gate array (FPGA) or an application-specific integrated circuit (ASIC)) to perform certain operations. A hardware engine may also comprise programmable logic or circuitry (e.g., as encompassed within a general-purpose processor or another programmable processor) that is temporarily configured by software to perform certain operations. It will be appreciated that the decision to implement a hardware engine mechanically, in dedicated and permanently configured circuitry, or temporarily configured circuitry (e.g., configured by software) may be driven by cost and time considerations.

The various operations of example methods described herein may be performed, at least partially, by one or more processors, e.g., processor 902, that are temporarily configured (e.g., by software) or permanently configured to perform the relevant operations. Whether temporarily or permanently configured, such processors may constitute processor-implemented engines that operate to perform one or more operations or functions. The engines referred to herein may, in some example embodiments, comprise processor-implemented engines.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Upon reading this disclosure, those of skill in the art will appreciate still additional alternative structural and functional designs for a similar system or process through the disclosed principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

What is claimed is:

1. A system comprising:

an autonomous drone adapted to navigate a warehouse environment, the autonomous drone carrying a swappable first battery;

a base station for receiving the autonomous drone to perform a battery swap, the base station carrying a plurality of batteries and comprising a plurality of charging ports to recharge a plurality of idle batteries, an idle battery being a battery that has a state of charge below a threshold battery requirement; and a computing device in communication with the base station, the computing device adapted to extend battery lives of the plurality of batteries by planning a charging schedule of the plurality of batteries, the computing device adapted to:

receive a planned path of the autonomous drone;

determine an estimated duration of operation of the autonomous drone based on the planned path, wherein the estimated duration is determined using a machine learning model that predict the estimated duration based on historical paths and path metadata;

determine that the estimated duration of operation requires a plurality of instances of battery swapping, each instance of battery swapping comprising an exchange of a battery carried by the autonomous drone with a battery pre-charged by the base station;

determine a number of batteries required to complete the plurality of instances of battery swapping;

determine the charging schedule based on the number of batteries required to complete the plurality of instances of battery swapping;

causing the base station to charge the plurality of batteries from an idle state to a state of charge above the threshold battery requirement in anticipation of the number of batteries required to complete the plurality of instances of battery swapping; and causing the base station to swap the first battery carried by the autonomous drone with one of the plurality of batteries subsequent to the autonomous drone returning to the base station as a first instance of battery swapping among the plurality of instances.

2. The system of claim 1, wherein the state of charge level is selected from one or more predefined battery levels.

3. The system of claim 1, wherein the base station is further adapted to monitor the state of charge state of the plurality of batteries.

4. The system of claim 3, wherein the base station is further adapted to:

compare the state of charge state to a battery requirement; and responsive to the state of charge state not meeting the battery requirement, take a remediation action.

5. The system of claim 3, wherein charging the plurality of batteries comprises charging the plurality of batteries according to a charging requirement, the charging requirement based on the state of charge state.

6. The system of claim 5, wherein the charging requirement for a battery with a battery pack voltage between 8V and 10V includes charging the battery for 3 minutes at 1.2 A.

7. The system of claim 5, wherein the charging requirement for a battery with an idle time of one day includes discharging the battery to a battery level of 50%.

8. The system of claim 5, wherein the charging requirement for a battery with an idle time of seven days includes discharging the battery to a battery level of 30%.

9. A method comprising:

receiving a planned path of an autonomous drone, the autonomous drone carrying a swappable first battery and is chargeable at a base station that carries a plurality of batteries;

determining an estimated duration of operation of the autonomous drone based on the planned path for extending battery lives of the plurality of batteries by planning a charging schedule of the plurality of batteries, wherein the estimated duration is determined using a machine learning model that predict the estimated duration based on historical paths and path metadata;

determining that the estimated duration of operation requires a plurality of instances of battery swapping, each instance of battery swapping comprising an exchange of a battery carried by the autonomous drone with a battery pre-charged by the base station;

determining a number of batteries required to complete the plurality of instances of battery swapping;

determining the charging schedule based on the number of batteries required to complete the plurality of instances of battery swapping;

charging, at the base station for receiving the autonomous drone, the plurality of batteries from an idle state to a state of charge above a threshold battery requirement in anticipation of the number of batteries required to complete the plurality of instances of battery swapping, wherein the base station comprises a plurality of charging ports to recharge a plurality of idle batteries, an idle battery being a battery that has a state of charge below the threshold battery requirement; and swapping the first battery carried by the autonomous drone with one of the plurality of batteries subsequent to the autonomous drone returning to the base station as a first instance of battery swapping among the plurality of instances.

10. The method of claim 9, wherein the state of charge level is selected from one or more predefined battery levels.

11. The method of claim 9, further comprising monitoring the state of charge state of the plurality of batteries.

12. The method of claim 11, further comprising:

comparing the state of charge state to a battery requirement; and responsive to the state of charge state not meeting the battery requirement, taking a remediation action.

13. The method of claim 11, wherein charging the plurality of batteries comprises charging the plurality of batteries according to a charging requirement, the charging requirement based on the state of charge state.

14. The method of claim 13, wherein the charging requirement for a battery with a battery pack voltage between 8V and 10V includes charging the battery for 3 minutes at 1.2 A.

15. The method of claim 13, wherein the charging requirement for a battery with an idle time of one day includes discharging the battery to a battery level of 50%.

16. The method of claim 13, wherein the charging requirement for a battery with an idle time of seven days includes discharging the battery to a battery level of 30%.

17. A base station for receiving an autonomous drone to perform a battery swap, the autonomous drone adapted to navigate a warehouse environment and carrying a swappable first battery, the base station comprising:

a plurality of charging ports to recharge a plurality of idle batteries, an idle battery being a battery that has a state of charge below a threshold battery requirement;

one or more processors; and one or more memories coupled to the one or more processors, the one or more memories storing one or more sets of instructions for extend battery lives of a plurality of batteries by planning a charging schedule of the plurality of batteries, the one or more sets of instructions, when executed by the one or more processors, cause the one or more processors to:

receive a planned path of the autonomous drone;

determine an estimated duration of operation of the autonomous drone based on the planned path, wherein the estimated duration is determined using a machine learning model that predict the estimated duration based on historical paths and path metadata;

determine that the estimated duration of operation requires a plurality of instances of battery swapping, each instance of battery swapping comprising an exchange of a battery carried by the autonomous drone with a battery pre-charged by the base station;

determine a number of batteries required to complete the plurality of instances of battery swapping;

determine the charging schedule based on the number of batteries required to complete the plurality of instances of battery swapping;

causing the base station to charge the plurality of batteries from an idle state to a state of charge above the threshold battery requirement in anticipation of the number of batteries required to complete the plurality of instances of battery swapping; and causing the base station to swap the first battery carried by the autonomous drone with one of the plurality of batteries subsequent to the autonomous drone returning to the base station as a first instance of battery swapping among the plurality of instances.

18. The base station of claim 17, wherein the state of charge level is selected from one or more predefined battery levels.

19. The base station of claim 17, wherein the one or more sets of instructions further comprise instructions that cause the one or more processors to monitor the state of charge state of the plurality of batteries.

20. The base station of claim 19, wherein the one or more sets of instructions further comprise instructions that cause the one or more processors to:

compare the state of charge state to a battery requirement; and responsive to the state of charge state not meeting the battery requirement, take a remediation action.

* * * * *